United States Patent
Hirabayashi et al.

(10) Patent No.: US 6,227,649 B1
(45) Date of Patent: May 8, 2001

(54) MULTIMODE INK JET RECORDING DEVICE IN WHICH RECORDING MODE IS SELECTED ACCORDING TO RECORDING MEDIUM

(75) Inventors: Hiromitsu Hirabayashi, Yokohama; Atsushi Arai, Kasukabe; Hiroshi Tajika; Noribumi Koitabashi, both of Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/476,347

(22) Filed: Jun. 7, 1995

Related U.S. Application Data

(62) Division of application No. 08/360,121, filed on Dec. 20, 1994, now abandoned, which is a continuation of application No. 07/921,462, filed on Jul. 28, 1992, now abandoned, which is a continuation of application No. 07/671,147, filed on Mar. 18, 1991, now abandoned, which is a continuation of application No. 07/470,775, filed on Jan. 26, 1990, now abandoned.

(30) Foreign Application Priority Data

Jan. 28, 1989 (JP) .................................................... 1-018229
Jan. 28, 1989 (JP) .................................................... 1-018230
Jan. 25, 1990 (JP) .................................................... 2-013486

(51) Int. Cl.$^7$ .................................................... B41J 2/145
(52) U.S. Cl. ................................................................ 347/40
(58) Field of Search ................................. 347/16, 41, 40, 347/43

(56) References Cited

U.S. PATENT DOCUMENTS

| | | | |
|---|---|---|---|
| 4,528,576 | 7/1985 | Koumura et al. | 347/15 |
| 4,540,996 | 9/1985 | Saito | 347/43 |
| 4,593,295 | 6/1986 | Matsufuji et al. | 347/41 |
| 4,614,967 | * 9/1986 | Sayanagi | 347/43 X |
| 4,617,580 | 10/1986 | Miyakawa | 347/14 X |
| 4,712,172 | 12/1987 | Kiyohara | 347/60 |
| 4,721,968 | * 1/1988 | Arai | 347/14 X |
| 4,748,453 | 5/1988 | Lin | 347/41 |
| 4,812,859 | 3/1989 | Chan | 347/63 |
| 4,855,752 | 8/1989 | Bergstedt | 347/41 |
| 4,864,328 | 9/1989 | Fischbeck | 347/43 |
| 4,908,638 | 3/1990 | Albosta et al. | 347/43 |
| 4,967,203 | 10/1990 | Doan et al. | 347/41 |
| 5,486,848 | 1/1996 | Ayata et al. | 347/15 |

FOREIGN PATENT DOCUMENTS

| | | | |
|---|---|---|---|
| 0300595 | 1/1989 | (EP) . | |
| 58-194541 | * 11/1983 | (JP) | B41J/3/00 |
| 63-188052 | 8/1988 | (JP) . | |

OTHER PUBLICATIONS

European Patent Office Search Report for European Patent Application No. 90101616.2.

* cited by examiner

Primary Examiner—Sandra Brase
(74) Attorney, Agent, or Firm—Fitzpatrick, Cella, Harper & Scinto

(57) ABSTRACT

An ink jet recording device includes scanning means for scanning ink jet recording heads in a scanning direction, each of the recording heads having plural ink discharge generating elements and plural discharge ports associated therewith, the discharge ports being adapted to perform a recording operation within a recording area which is a total area covered by the discharge ports during one scanning operation, supplying means for supplying recording signals corresponding to the recording area to a group of the ink discharge energy generating elements, and conveying means for conveying a recording medium relative to the recording heads. A control means controls the ink jet recording heads, supplying means and conveying means so that when the control means operates in a first recording mode, a recording within the recording area is completed in a single scanning operation, and when the control means operates in a second recording mode, the recording within the recording area is completed by plural scanning operations such that the recording area is subjected to the overlapped recordings by different discharge ports. The control means selects the recording mode according to a condition relating at least to a material quality of the recording medium.

19 Claims, 20 Drawing Sheets

FIG.5

IMAGE BLOTTING EVALUATION

| INK EMISSION DENSITY (nℓ/mm²) | 10.0 | 12.5 | 15.0 | 17.5 | 20.0 | 22.5 | 25.0 | 27.5 | 30.0 |
|---|---|---|---|---|---|---|---|---|---|
| NON-COATED PAPER A | ○ | ○ | ○ | ○ | △ | × | × | × | × |
| NON-COATED PAPER B | ○ | ○ | ○ | ○ | ○ | × | × | × | × |
| NON-COATED PAPER C | ○ | ○ | ○ | ○ | △ | △ | × | × | × |
| COATED PAPER D | ○ | ○ | ○ | ○ | ○ | ○ | ○ | △ | △ |

(1st. SCAN)

(2nd. SCAN)

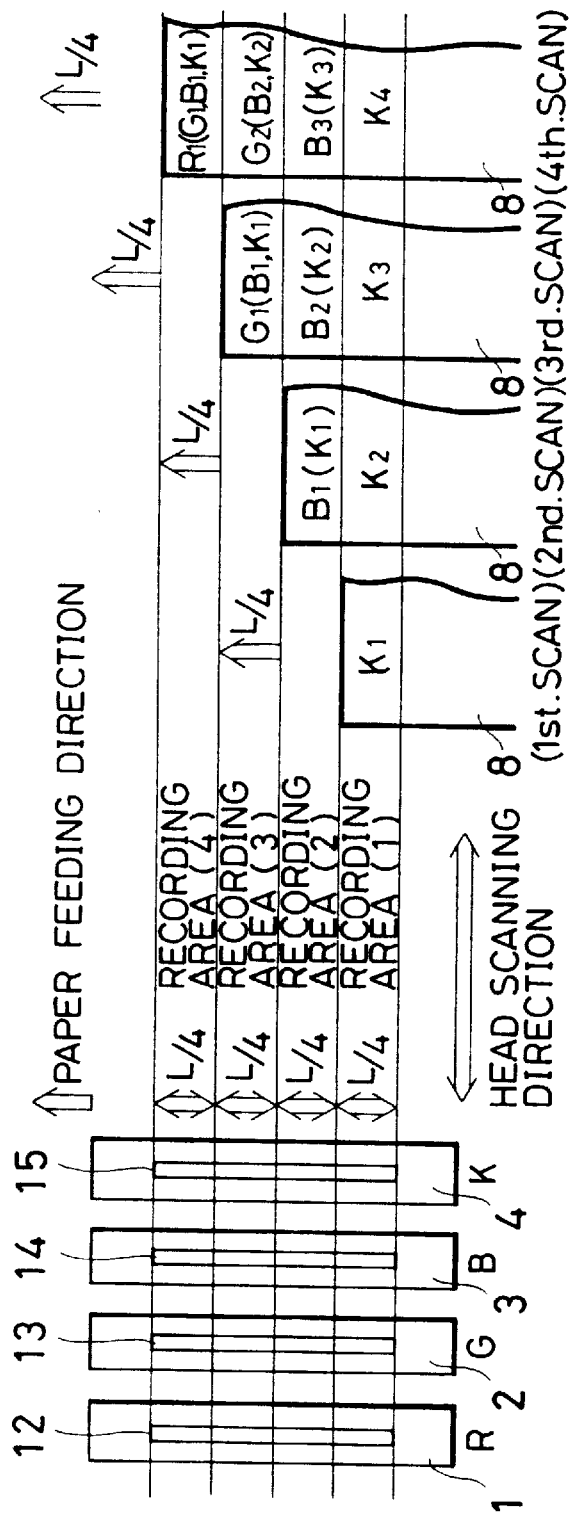

MULTIMODE INK JET RECORDING DEVICE IN WHICH RECORDING MODE IS SELECTED ACCORDING TO RECORDING MEDIUM

This application is a continuation of application Ser. No. 08/360,121 filed Dec. 20, 1994, which was a continuation of application Ser. No. 07/921,462 filed Jul. 28, 1992, which was a continuation of application Ser. No. 07/671,147 filed Mar. 18, 1991, which was a continuation of application Ser. No. 07/470,775 filed Jan. 26, 1990, all now abandoned.

BACKGROUND OF THE INVENTION

1. Field of the Invention

This invention relates to an ink jet recording method and a color ink jet recording device which are applied to copying machines, facsimiles, printers for image processing, and other printers in general. More particularly, it pertains to a scanning type ink jet recording device equipped with a plural number of recording heads having a plural number of discharge ports arrayed in the sub-scanning direction and to a recording method of said device.

2. Related Background Art

In the prior art, for improvement of gradation or density of recorded images, it has been practiced to form a plural number of picture elements for forming the image on a recording medium with a plural number of overlapping ink droplets, or for improvement of adjacent picture element densities, to shoot a plural number of ink droplets at a high density. When this is applied to color, there is the advantage that color reproducibility can be improved.

Further, in the case when the recording medium is a transparent film for transmission type OHP (overhead projector), etc., the image recorded thereon is required to be increased in transmission density as a whole, and also in this case the above system is effective.

In these systems, emission of ink droplets for emitting a plurality of ink droplets on one picture element is performed by scanning of the recording head for plural times while the recording medium is fixed as such. Accordingly, scanning for plural times corresponding to higher densification or scanning for plural times corresponding to the ink colors to be mixed is required for the recording range per one scanning in scanning type recording, and no high speed recording can be practiced. In other words, if a high density image or a color image is formed for ordinary printing, a printing time is required which is as long as 2-fold to 4-fold of the time required for ordinary printing.

Accordingly, for the purpose of making faster even by little the recording speed, in order to increase the recording range per one scanning, it is effective to enlarge the recording head by formation of a multi-nozzle, but since it is limited to make the head lengthy, the ratio of shortening of the printing time is little in scanning type ink jet recording.

In contrast, U.S. Pat. No. 4,320,406 discloses a constitution which miniaturizes the head constitution itself of a color device by dividing the nozzles (discharge port) of the single recording head itself formed into a multi-nozzle into four nozzle units predetermined for different inks, but since the recording speed depends on only one recording head, the ink discharge range of one color is reduced to great extent, whereby the advantage of the recording formed into a multi-nozzle will be lost.

The present inventors have investigated about the prior art and found the following problems.

When image density is enhanced or color formation is effected by scanning for plural times continuously for the recording range to be recorded by one scanning, because the picture element is formed by ink discharge for plural times, the ink amount per one picture element becomes larger, and therefore in the case of recording medium of which ink receptive amount is limited such as film for OHP or one having poor ink absorptivity, the amount or the rate of ink absorption is limited, whereby ink may be sometimes overflowed from the picture element, resulting in deterioration of the image quality.

Particularly, a plural number of recording heads corresponding to the respective inks had a constitution arranged in the scanning direction, and therefore in the case when different inks were overlapped, the emission density per unit time became greater, whereby the above problem of ink overflow became marked.

Generally speaking, recording papers with increased ink absorption amount have been known, and recording is possible only on expensive and specific converted papers and only for limited recording. However, when users employ another paper or sheet, defective recording may be brought about, and in the worst case, users sometimes judged that the recording head was defective to make the recording head useless.

Anyway, even by use of a multi-nozzle head, because scanning is performed for plural times by stopping of paper feeding of the recording medium, the recording speed cannot be lowered, and also, when only a recording medium excellent ink absorptivity is used, the disadvantages of the users by limitation of the recording will be brought about, such as the disadvantage of failing to use a diversity of recording media.

Further, as the problem of fixability, boundary region, the following facts have been found out, and it has been found that the difference in recording characteristics becomes marked when using different recording media.

More specifically, a great difference in ink absorption ability occurs at the boundary portion of the scanning line in overlapped recording, whereby density irregularity due to nonuniform ink absorption is liable to be generated.

Also, in the constitution which performs recording for plural times on the same picture element through the same discharge port, irregularity in density and shooting precision between the discharge ports may be sometimes intensified to lower the picture element.

Further, since the ink densities change at the same time over the whole region of the width of the discharge port (scanning region), and therefore stretching and shrinkage of the recording medium accompanied with ink absorption will occur at the same time, whereby the change amount becomes greater.

On the other hand, divided recording is a system which is to be used for a recording medium inferior in absorption characteristic, and even after the final scanning (ink emission), the recorded surface cannot be touched before elapse of a certain time. Therefore, the members such as discharge rollers, press rollers, etc. are required to be departed from the above-mentioned recording region by the head width or more, whereby enlargement of the device or lowering in paper feeding precision may be brought about.

Further, the problem of stretching and shrinkage of the recording medium as mentioned above also occurs in divided recording.

SUMMARY OF THE INVENTION

The present invention is intended to provide an ideal ink jet recording device which has solved the problems as described above in the case of using a plural number of recording heads equipped with a plural number of discharge ports (also called multi-nozzle head).

A first object of the present invention is to provide an ink jet recording device which can make recording speed faster than in the prior art and can improve overlapped recorded image or high density recorded image with the so called multi-nozzle ink jet recording head.

A second object of the present invention is to provide a recording method improved in fixability which can also make the enlarged portion in use of a plural number of recording heads miniaturized as the whole device.

A further object of the present invention in cancelling the problems as described above is to provide an ink jet recording device which can prevent deterioration of image quality according to ink absorptivity of the recording medium without lowering recording speed, and also is capable of good recording on a diversity of recording media.

Still another object of the present invention is to provide an ink jet recording device which can perform preferably recording of high speed and high image quality depending on the kind of the recording medium by utilizing the advantage of the multi-nozzle recording head to the maximum.

Still other objects of the present invention will be understood from the following description.

Here, representative embodiments of the present invention are set forth specified below.

One embodiment of the present invention is an ink jet recording device comprising:

a carriage having a plural number of ink jet recording heads each having a plural number of discharge ports mounted thereon;

a means for giving recording ink signals to the ink discharge energy generating elements corresponding to all or a part of the respective plural number of discharge ports of said plural number of recording heads; and a control means, which increases the number of recording heads to be used during recording of the recordable region formed by the total sum of all the discharge regions of said plural number of recording heads from initiation of recording onto a recording medium, reducing the number of recording heads to be used during recording of said recordable region in the recording completion region of the recording medium, and has one scanning width to be recorded by scanning by the recording head during recording as the feeding pitch of the recording medium.

Another embodiment of the present invention is an ink jet recording device which has a plural number of recording heads having discharge ports for discharging ink arrayed thereon, and performs recording of images by discharging ink through said discharge ports accompanied with the scanning movement of said plural number of recording heads, characterized in that said device has a first recording head and a second recording head provided adjacent to the upstream side and down stream side relatively with respect to the conveying direction of the recording medium,.and arranged in the positional relationship with the respective discharge ports not overlapping each other in the upstream side region and the downstream side region, and a recording mode which performs recording so that at least the image of first ink droplets on the recording medium by the first recording head relatively on the upstream side and the image of the second ink droplets on the recording medium by the second recording head relatively on the downstream side may be overlapped with each other.

More preferably, another embodiment is an ink jet recording device which has a plural number of recording heads having discharge ports for discharging ink arrayed thereon, and performs recording of images by discharging ink through said discharge ports accompanied with the scanning movement of said plural number of recording heads, characterized in that each of said plural number of recording heads and at least another of said plural number of recording heads are arranged so that said discharge ports arrayed on each may not overlap each other in said scanning direction, and said device is provided with a paper feeding means which performs paper feeding with the width of the recording regions by said scanning movement of the recording heads arranged so as not to overlap each other, and a recording signal supplying means which supplies recording signals for discharge to the respective recording heads of said plural number of recording heads corresponding to the paper feeding by said paper feeding means.

Still another embodiment is an ink jet recording device, which has a plural number of recording heads, each constituted by arraying a plural number of discharge ports for discharging ink in the sub-scanning direction or a direction different from the scanning direction, in the scanning direction, and performs recording of images by discharging ink through said discharge ports accompanied with the scanning movement of said plural number of recording heads, characterized in that said device is provided with a conveying means which conveys the recording medium with the width of the equally divided region of the recording region by scanning of said plural number of recording heads per every time of said scanning movement, and a recording signal supplying means which supplies recording signals to only the discharge ports predetermined corresponding to said equally divided regions in response to said conveying by said conveying means.

There is also provided an ink jet recording device, which has a recording head constituted by arranging a discharge port for discharging ink in the sub-scanning direction or a direction different from the scanning direction, arranged in the scanning direction, and performs recording of images by discharging ink through said discharge port accompanied with the scanning movement of said plural number of recording heads, characterized in that said device is provided with a conveying means which performs conveying the recording medium with the width of the equally divided region of the recording region by scanning of said recording heads per every time of said scanning movement, and a recording signal supplying means which supplied recording signals to only the discharge ports predetermined corresponding to said equally divided regions in response to said conveying by said conveying means, An embodiment of this invention which may be of particular interest involves an ink jet recording device including scanning means for scanning ink jet recording heads in a scanning direction, each of the recording heads having plural ink discharge generating elements and plural discharge ports associated therewith, the discharge ports being adapted to perform a recording operation within a recording area which is a total area covered by the discharge ports during one scanning operation, supplying means for supplying recording signals corresponding to the recording area to a group of the ink discharge energy generating elements, and conveying means for conveying a recording medium relative to the recording heads. A control means controls the ink jet recording heads, supplying means and conveying means so that when the control means operates in a first recording mode, a recording within the recording area is completed in a single scanning operation, and when the control means operates in a second recording mode, the recording within the recording area is completed by plural scanning operations such that the recording area is subjected to the overlapped recordings by different discharge ports. The control means selects the recording mode according to a condition relating at least to a material quality of the recording medium.

In either one of the above inventions, in using a plural number of recording heads having a plural number of discharge ports, the ratio of the recording medium moved can be made greater than in the prior art, and therefore the recording speed can be improved, whereby excellent image can be formed by utilizing all or a part of the plural number of discharge ports or a part of the recording medium defined depending on the material, and therefore the image quality can be made further stable.

Also, in performing overlapped recording, the recording time can be reduced, and also the joining portion of images can be made better.

BRIEF DESCRIPTION OF THE DRAWINGS

FIG. 5 is an illustration showing the image evaluations corresponding to the ink densities of the recording medium;

FIG. 14A and FIG. 14B are conceptional views of the recording method in the fourth embodiment;

DETAILED DESCRIPTION OF THE PREFERRED EMBODIMENTS

Figure 1:
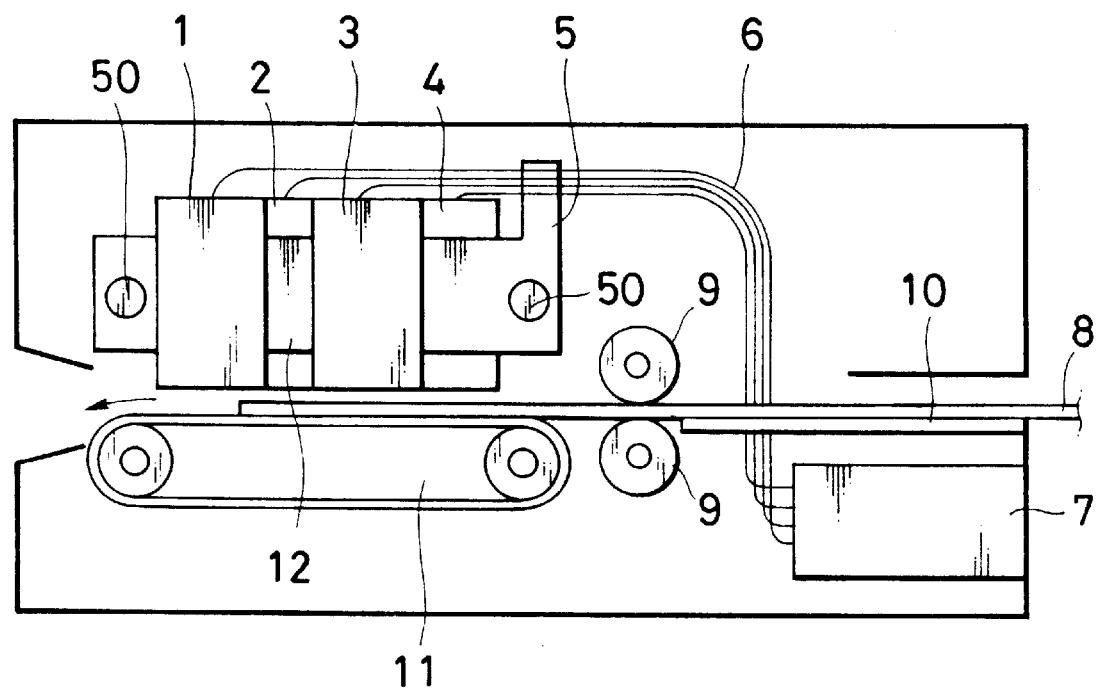
FIG. 1 is a side sectional view of the ink jet recording device according to a first embodiment of the present invention.

Referring now to the drawings, the embodiments of the present invention are described in detail.

FIG. 1 is a side sectional view showing the principal portion of the ink jet recording device according to an embodiment of the present invention. In the FIGS. 1 to 4 are recording heads each having 64 ink discharge ports, and the ink passage communicated to these discharge ports has an electrothermal transducer for generating energy for discharging ink arranged therein. Also, the recording heads 1, 2, 3 and 4 are recording heads for discharging respectively inks of red (R), green (G), blue (B) and black (B), and they are respectively held on the carriage 5. With such arrangement, the directions of the discharge port array in the respective recording heads forms the sub-scanning direction as described below with reference to FIG. 3A, and they are arrayed so that the recording region by scanning may be the same.

The carriage 5 is engaged slidably with a pair of guide shafts and is also movable in the scanning direction (the direction perpendicular to the drawing) by the carriage motor as described below.

The recording heads 1 to 4 are connected electrically through the carriage to the main control section as described below with reference to FIG. 2, and otherwise connected to the ink tanks of the respective colors at the ink tank portion 7 by the ink tube bundle 6 corresponding flexibly to the movement of the carriage 5 so that ink supply can be done. On the other hand, the recording medium 8 is conveyed by the conveying roller pair 9 through the paper feeding guide 10 at a predetermined timing successively in the arrowhead direction in the Figure to the recording portion. At the recording portion, the recording medium 8 is adsorbed through the electrostatic attracting force of the adsorption conveying belt 11, and adsorption supporting conveying is done while being synchronized with the conveying roller pair 9 with movement of the belt 11, and the medium stops successively at predetermined positions to perform recording.

Figure 2:
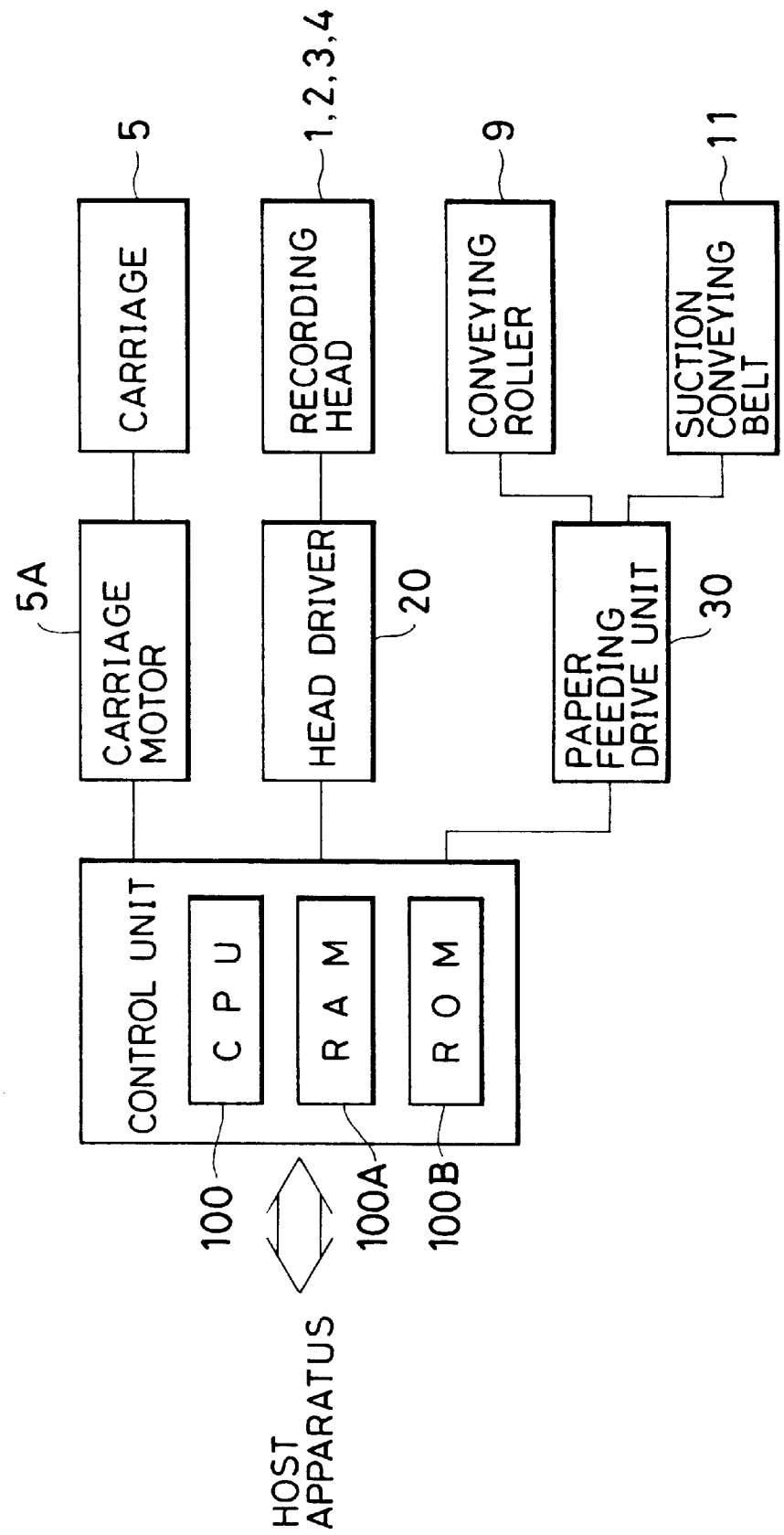
FIG. 2 is a block diagram showing the control constitution according to recording of the device shown in FIG. 1.

FIG. 2 is a block diagram showing the recording control in the ink jet recording device shown in FIG. 1. In the same Figure, 5A is the carriage motor for driving the carriage 5 through a carriage driving mechanism such as belt, pooley, etc., and 20 is the head driver for generating discharge signals for the respective discharge ports based on the recording data supplied from the control section. 30 is the paper feeding driving section for driving the conveying roller 9 and the adsorption conveying belt 11, and is constituted mainly of a motor, etc.

Figures 3A, 3B:
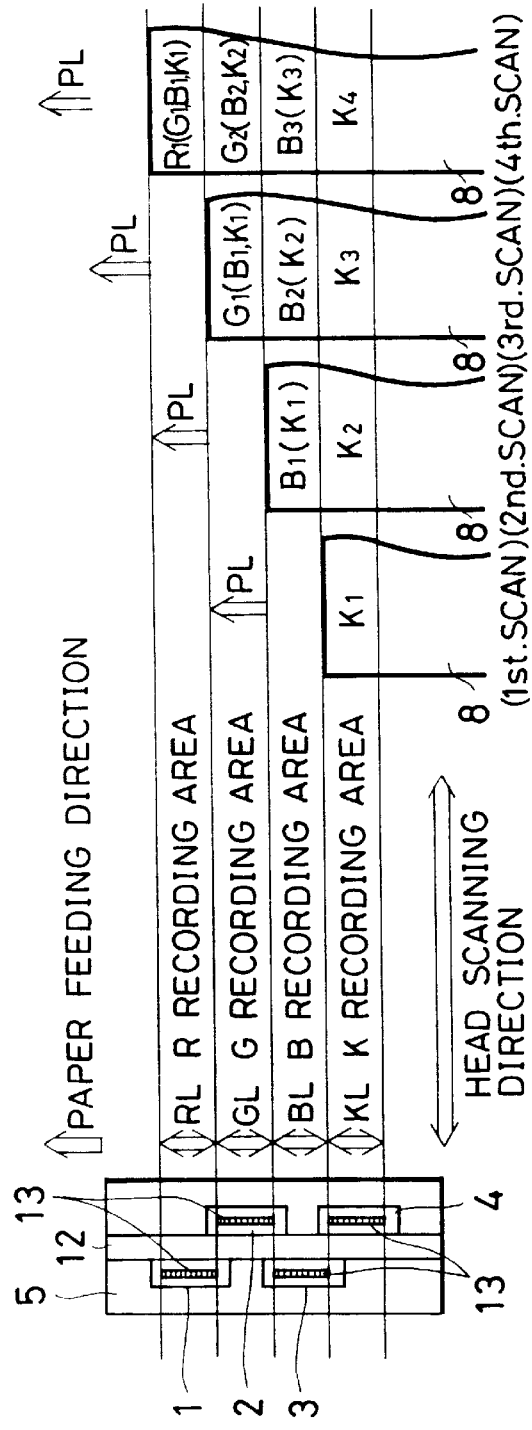
FIGS. 3A and 3B are conceptional views of the recording method in the first embodiment.

The control section shown in the Figure has CPU 100 which practices processing according to control of the device while performing giving and receiving of the data between the host device or the respective sections of the recording device, RAM100A which becomes the work area in processing of CPU100, and ROM100B which memorizes the processing procedure such as recording actuation, etc. as shown in FIG. 3A and FIG. 3B.

FIGS. 3A and 3B are conceptional views for illustration of the recording method in the embodiment shown in FIG. 1. In FIG. 3A, the recording heads 1 to 4 for discharging respectively the inks of the respective colors of R, G, B and K are, as mentioned above, supported and fixed so that the respective discharge port arrays 3 may become perpendicular to the scanning direction (sub-scanning direction) relative to the both surfaces of the head supporting portion 12.

In the same Figure, the discharge port array 13 cannot be seen as it is, but the recording head is shown as perspective from the rear thereof. More specifically, the array is made so that the widths of the discharge port arrays of the recording head (in the Figure, RL=GL=BL=KL) may be connected to one another without gap, and the respective recording regions (R, G, B, K) by one scanning becomes continuous with the same width. When the recording medium is conveyed as described above to the recording regions (R, G, B, K), the carriage 5 scans to initiate recording.

The recording medium 8 stops at the position of (the first scanning) in FIG. 3A by the conveying roller pair 9 and the adsorption conveying belt 11. This position is under the state where the tip portion of the recording medium 8 is in the recording region K, and the recording medium has not reached other recording regions R, G, B. Therefore, in the first head scanning, recording is performed only with the K head.

After the first scanning, the recording medium 8 is again conveyed by the conveying roller pair 9 and the adsorption conveying belt 11. As is apparent from FIG. 3A, the conveying distance PL is set the same as the width (RL, GL, BL, KL) of the discharge port array. In the second scanning, the region recorded in response to the recording signal $K_1$ by the head 4 of K ink in the first scanning has moved to the B recording region, and recording is performed in response to the recording signal $B_1$ with the head 3 of B ink.

On the other hand, at the portion conveyed newly to the K recording region, recording is performed in response to the next recording signal $K_2$ with the head 4 of K ink. Here, since the recording medium 8 has not yet reached the R and G recording regions, still no recording is performed with the head 1 of R ink and the head of G ink.

After the second scanning, the recording medium is again conveyed by the PL width. In the third scanning, at the portion where recording was performed with the recording signals of $B_1$ and $K_1$, recording in response to the recording signal $G_1$ is done. At the portion where recording was performed with the recording signal $K_2$, recording is done in response to the recording signal $B_2$ with the head 3 of B ink. Also, at the K recording region, the recording signal $K_3$ is recorded with the head 4 of K ink.

After the third scanning, the recording medium is similarly conveyed by the Pl width and the fourth scanning is performed. In the fourth scanning, at the portion where recording was performed in response to the recording signals of K1, B1, G1, recording is done in response to the recording signal R1 with the head 1 of R ink. Thus, the recording medium is successively recorded at every PL width with inks of black, blue, green and red colors.

FIG. 3B shows the recording signals of the respective heads for every head scanning when recording of A4 size is performed with the recording head of this embodiment, and at the rear end of the recording medium, the recording signals are successively lost from the K head. After completion of recording of the final scanning, the recording medium 8 is discharged out of the machine.

Figure 4:
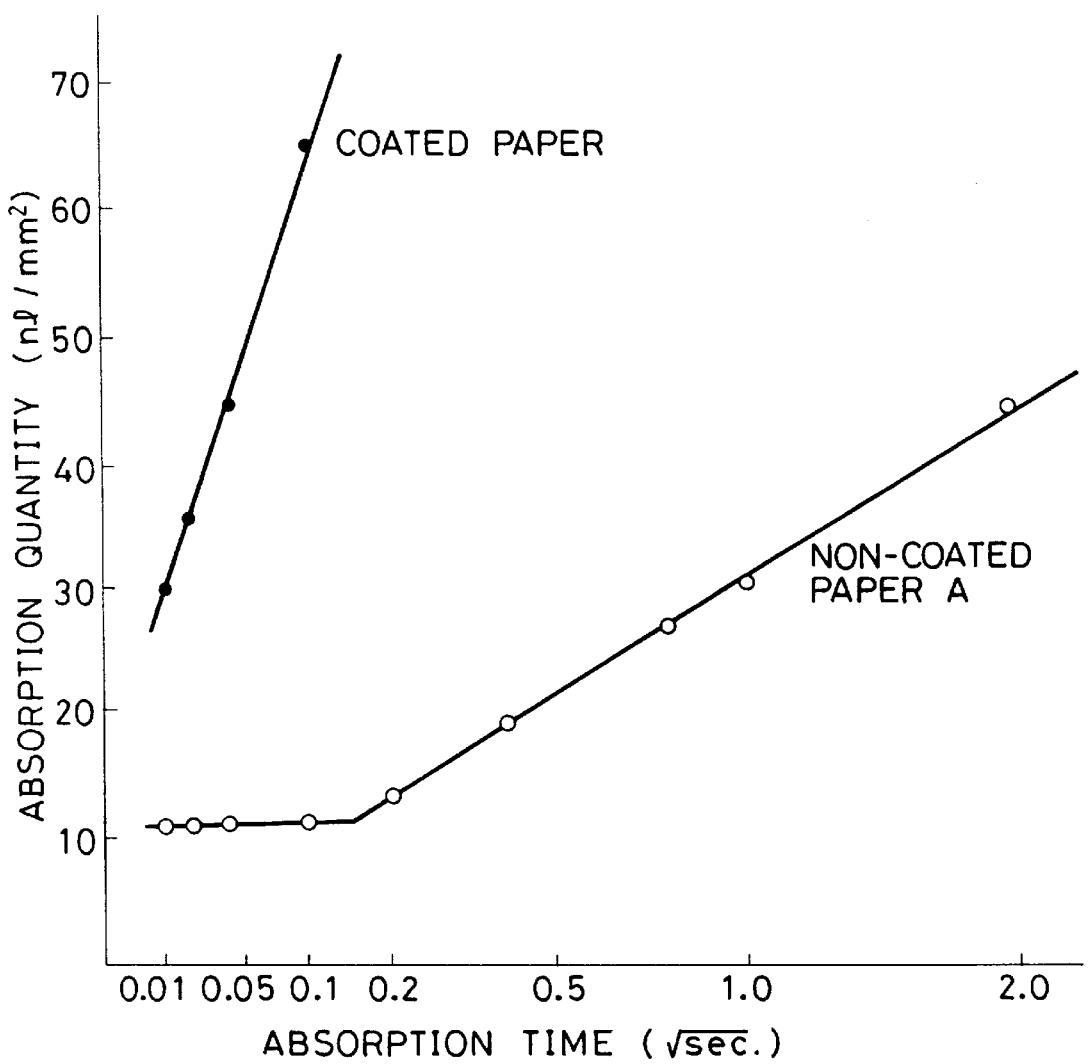
FIG. 4 is a graph showing the ink absorption characteristics of the recording medium.

Whereas, FIG. 4 shows the ink absorption characteristics of recording media, with square root of absorption time ($\sqrt{S}$) being shown on the axis of abscissa, and absorption amount of ink (aqueous) (nl/mm$^2$) on the axis of ordinate. It can be understood that, in the coated paper having an ink receptive layer provided on the surface layer, a large amount of ink can be absorbed within a short time, while in the non-coated paper used in this embodiment, initial absorption is low and a long time is required for absorption of ink.

FIG. 5 shows the results of examination of blotting degree of images when inks of two colors are emitted onto the recording medium substantially simultaneously (sharpness of the boundary portion between the inks of two colors) in Table. In this Table, the mark O shows one which is judged as practically useful, the mark Δ one which is slightly inferior in image quality and the mark x one which is entirely practically unuseful.

From this experiment, it can be seen that the ink amount which can be recorded within a short time is 20 nl/mm$^2$ or less in the non-coated paper and 25 nl/mm$^2$ or less in the coated paper. This phenomenon can be estimated to occur according to the mechanism shown in FIG. 6.

Figure 6A:
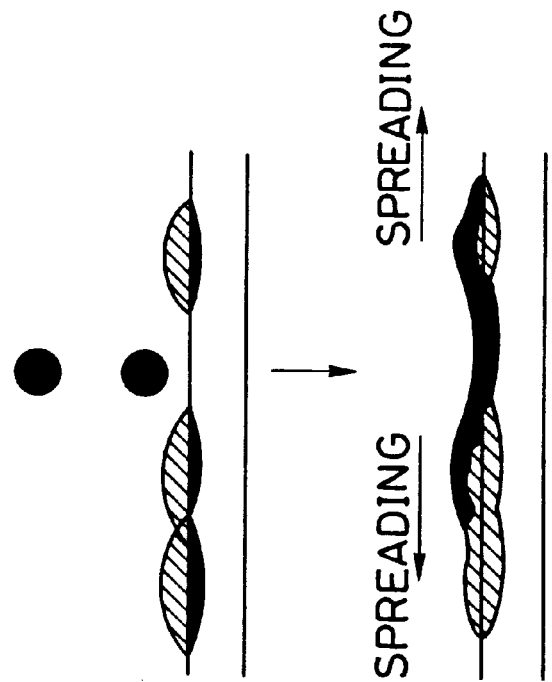
FIG. 6 is an illustration of image blotting of FIG. 6A and FIG. 6B.
Figure 6B:
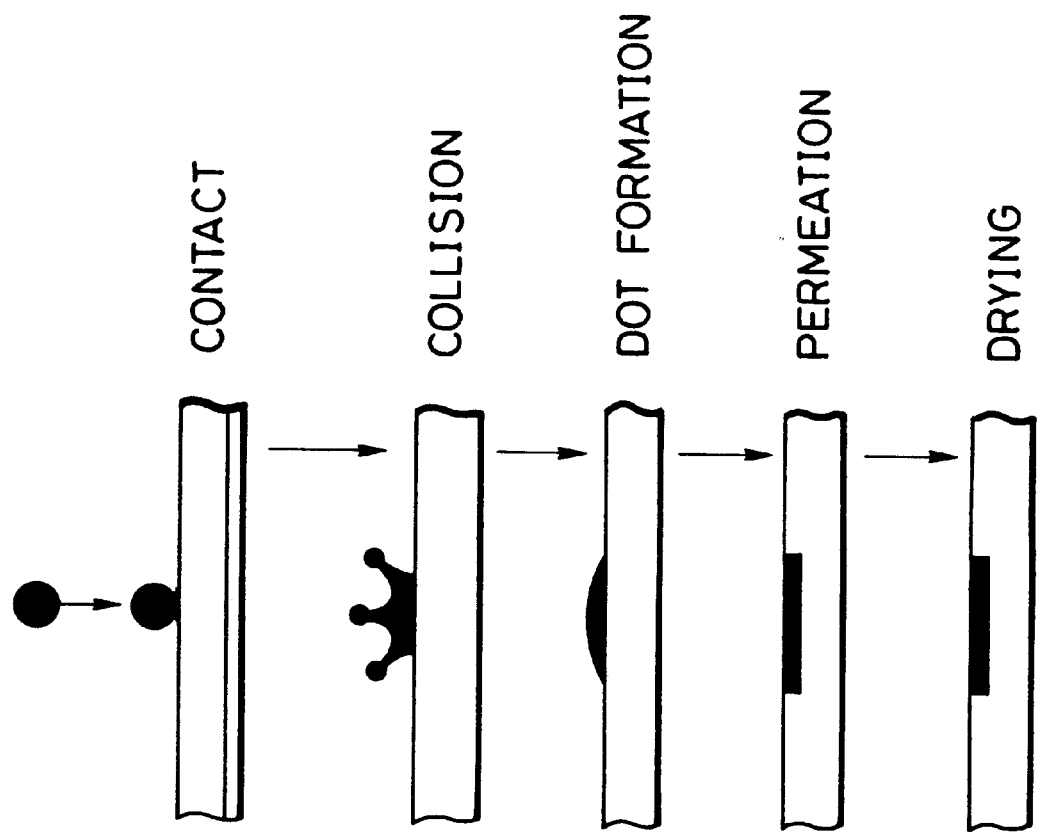

More specifically, the absorption of ink onto paper, as shown in FIG. 6A may be considered to be effected in the order of contact, collision, dot formation, permeation, drying. As shown in FIG. 4, in the case of the non-coated paper, in a time of 0.2 $\sqrt{S}$ or shorter, no ink of 11 to 12 nl/mm$^2$ or more can be absorbed and therefore, if an ink more than that is emitted substantially simultaneously, the ink will be overflowed and, as shown in FIG. 6B, the overflowed ink is attracted to the adjacent ink which has reached previously onto the paper, whereby blotting may be considered to occur at the boundary portion.

Figure 7A:
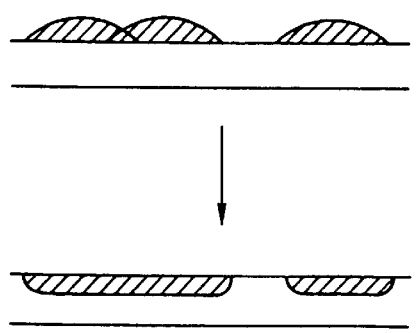
FIGS. 7A and 7B are illustrations of overlapping of inks in the embodiment of the present invention.
Figure 7B:
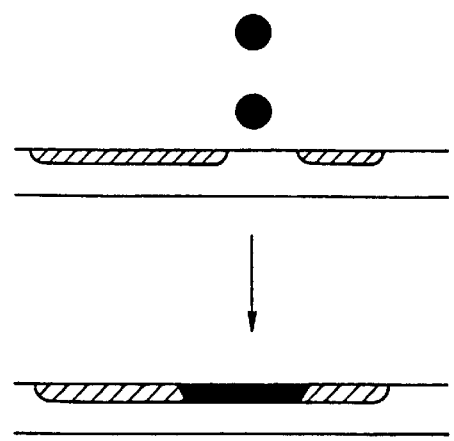

In contrast, in the present embodiment, since head scanning is performed successively with the recording regions for the respective heads being separated in one scanning, blotting at the boundary portion becomes smaller as shown in FIGS. 7A and 7B.

For verifying the effect of this embodiment, the recording test was performed under the conditions shown below and consequently good recorded images with little blotting at the boundary portion could be obtained. In contrast, when recording was performed simultaneously with the arrangement of heads being constituted so that the respective head recording regions were overlapped with each other as in the ink jet recording device in the prior art, images which were entirely practically useless were obtained.

To describe in detail, this embodiment can perform recording of 7 colors by use of 4 colors of R, G, B, K, and recording was performed on a recording medium of A4 size at a recording density of 360 DPI and a driving frequency of 5.4 kHz. For this recording medium, a two-fold paper on which the diameter of the ink droplet emitted is expanded to 2-fold is used.

In this case, because the recording density is 360 DPI, the picture element size becomes 70.56 μm square, and the dot diameter embedding the picture element as a whole becomes 100 μm. Accordingly, the droplet diameter emitted onto the 2-fold paper becomes 50 μm, namely its volume becomes 65.5 pl.

When recording is performed under such conditions, the plane density of mono-color (one discharge) becomes 13.2 nl/mm$^2$, and the plane density of two colors (two discharges) becomes 26.3 nl/mm$^2$, and when two colors are overlapped or adjoined at the same time as shown in FIG. 5, the image becomes bad.

As is apparent from the above description, this embodiment, which has been made to have a constitution excluding overlapping or adjoining of two colors within a short time, is also effective for a recording medium with poor water absorption as the non-coated paper.

Also, according to the above-mentioned recording conditions, since in this embodiment the recording region in one scanning is divided into 4, and therefore scanning for 68 times is required for recording of A4 size. This means that the scanning times are increased only by 3 as compared with the device constitution of the prior art, thus resulting in substantially no lowering in recording speed.

In contrast, for recording of the same A4 size, if the recording region is made the same as in the prior art and the boundary blotting is prevented by overlapping scanning for 4 times at the same position, scanning of 260 times which is 4-fold is required.

Also, for example, in the case of recording only of K ink, the recording medium may be discharged without performing the 66th to 68th scanning, and by doing so, there is no lowering in recording speed at all in the case of mono-color recording.

In the case when the recording medium is a transparent film formed of PET or PET coated with an water absorptive material, the present embodiment is also effective.

Further, the present embodiment is effective for obtaining recording of higher image quality even in the case of a recording medium having ink absorptivity such as the coated paper.

Figure 8:
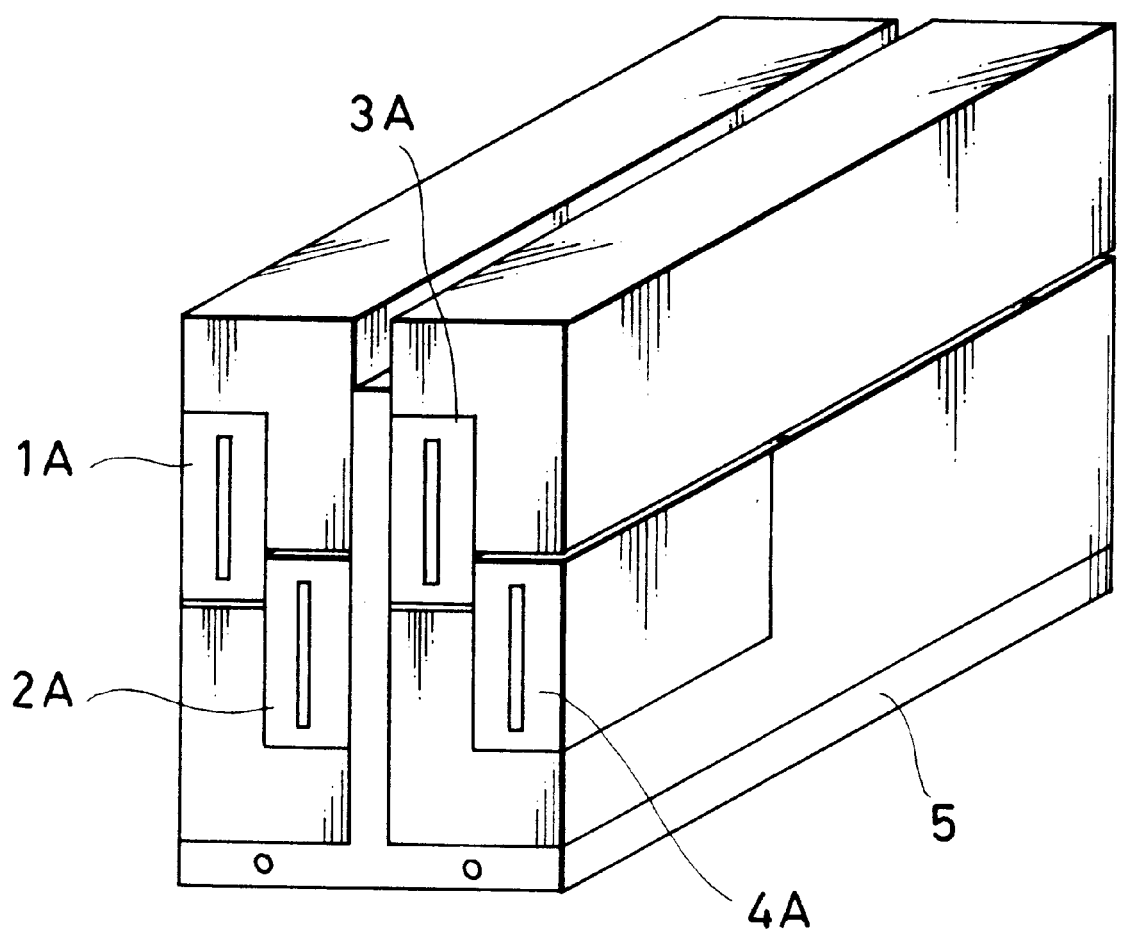
FIG. 8 is a perspective view showing an ink jet cartridge of 4 heads integrated in the second embodiment of the present invention.

FIG. 8 is a perspective view showing the second embodiment of the present invention, and this embodiment has a constitution of recording heads corresponding to recording of full color. That is, it has recording heads 1A, 2A, 3A and 4A corresponding to the respective colors of yellow (Y), magenta (M), black (K) and cyan (C).

Each of these recording heads has 128 discharge ports arrayed in the sub-scanning direction. Also, it is a recording head of the cartridge type which constitutes integrally the ink tanks of the respective colors, and therefore when there is no more ink, the whole recording head is exchanged with another cartridge.

When high resolution recording is performed as in this embodiment, the positional precision between the heads is required to be higher, and by exchange of the head with 4 colors integrated as in the head of this embodiment, it becomes possible to effect strict registration during shipment, and even in a device of the head exchange system, high image quality recording extracting fully the performance of the head is rendered possible.

Figures 9A, 9B:
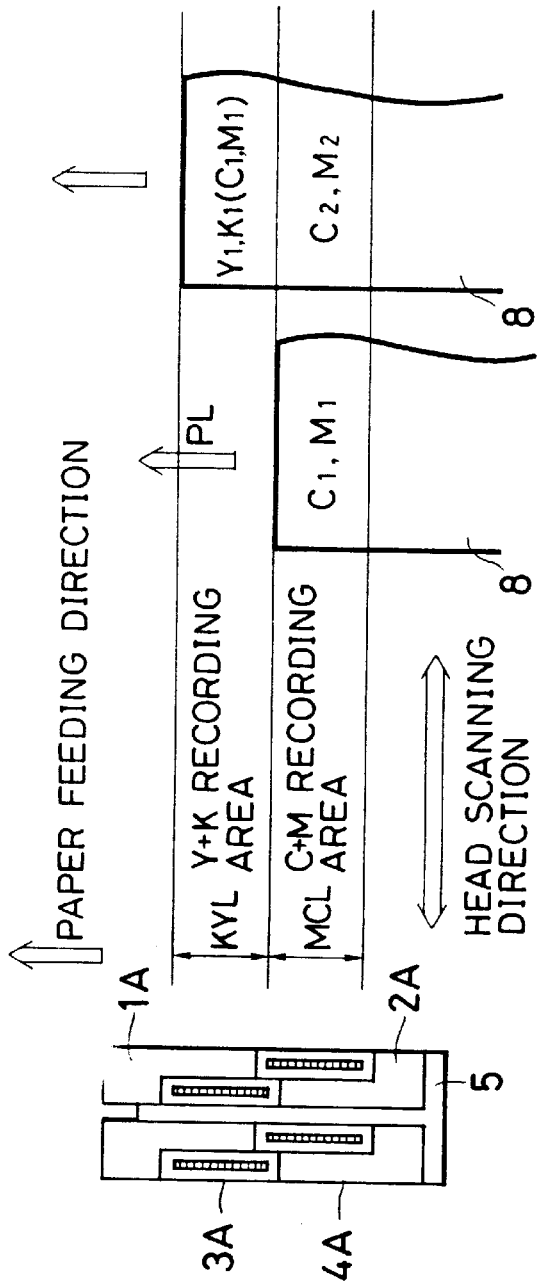
FIG. 9A and FIG. 9B are conceptional views of the recording method in the second embodiment.

FIGS. 9A and 9B are conceptional views showing the recording method by the recording head shown in FIG. 8, which are similar to FIGS. 3A and 3B, respectively.

This embodiment shows the constitution in which recording at a recording density of 600 DPI is performed on a 2-fold paper. Thus, since the recording density is 600 DPI, the picture element size 42.33 μm is determined, and similarly as described above, the droplet diameter becomes 30 μm and its volume 14.2 pl.

As the result, the plane density when monocolor, 2 colors, 3 colors and 4 colors are emitted overlappingly or adjoiningly become respectively 7.9 nl/mm$^2$, 15.8 nl/mm$^2$, 23.7 nl/mm$^2$ and 31.6 nl/mm$^2$. Again, as is apparent from FIG. 5, the permissible range where no blotting of ink occurs in this embodiment is up to 2 colors.

Accordingly, as shown in FIG. 9, it becomes possible that the recording heads corresponding to 2 colors make the recording regions the same. In the case of the same Figure, as shown in FIG. 9A, the recording heads 2A and 4A of M ink and C ink have the same recording regions as the recording heads 1A and 3A of Y ink and K ink, respectively, and recording of A3 size is performed by scanning for 77 times in the data mode as shown in FIG. 9B.

Figure 10:
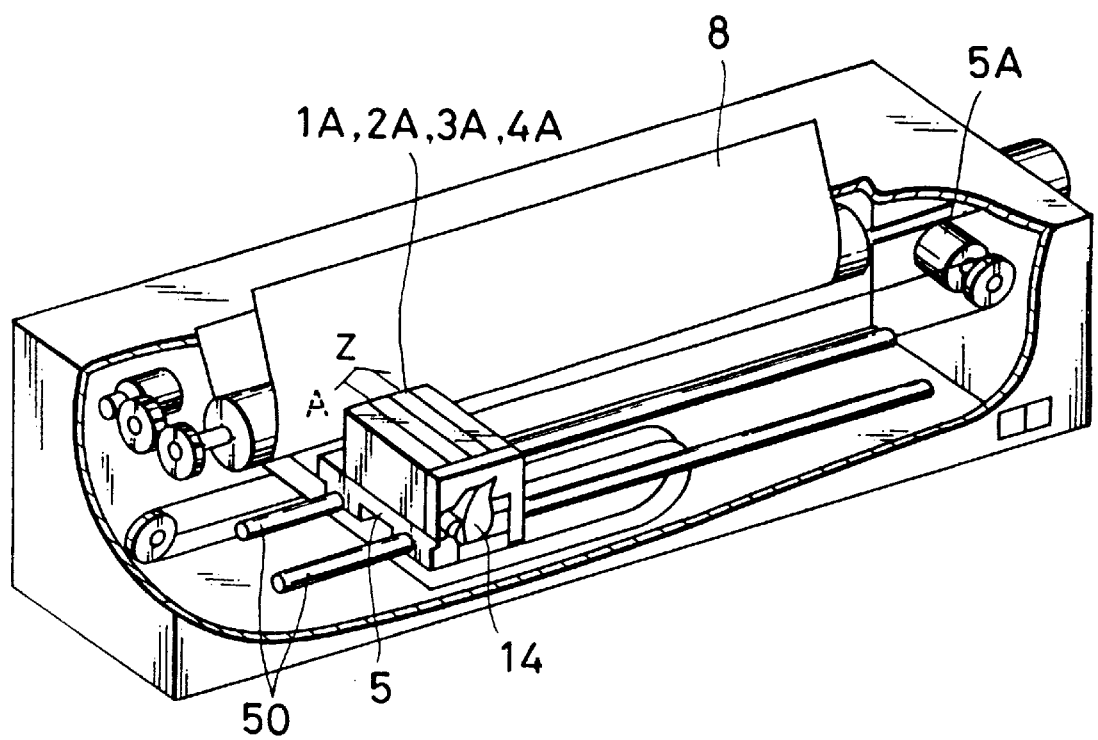
FIG. 10 is a perspective view of the ink jet recording device according to the second embodiment of the present invention.

FIG. 10 is a perspective view of an ink jet recording device which can mount the recording heads shown in FIG. 8 and FIG. 9, and the carriage 5 is engaged slidably with a pair of guide shafts, and makes scanning of the recording regions with the recording heads 1A, 2A, 3A, 4A possible by driving of the carriage motor 5A.

Figure 11:
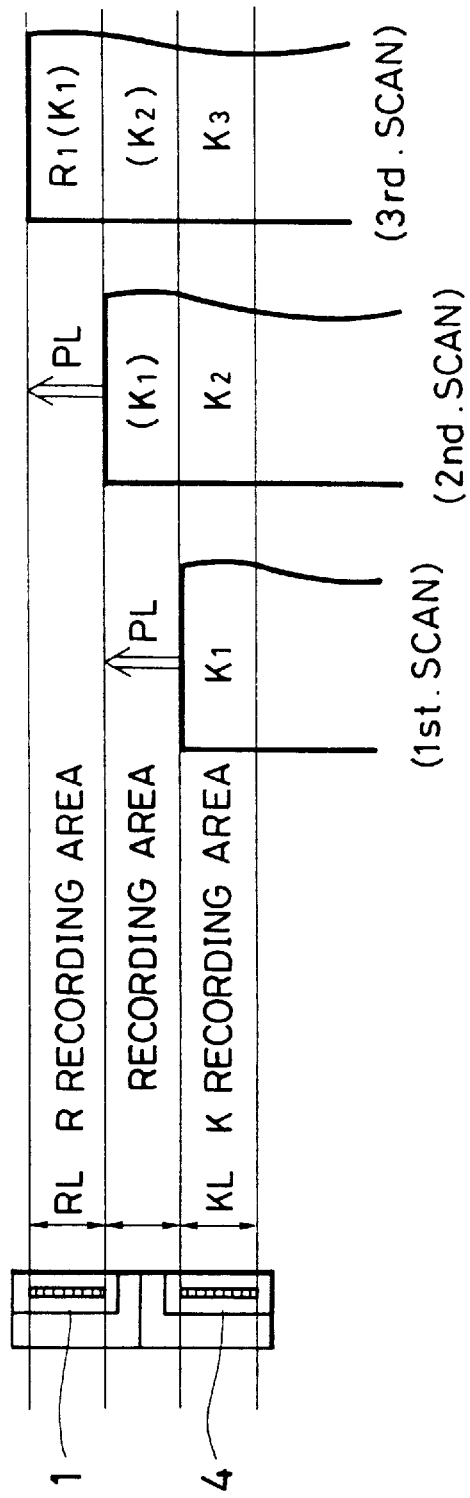
FIGS. 11A and 11B are conceptional views of the recording method in the third embodiment of the present invention.

FIGS. 11A and 11B are conceptional views showing the recording method according to the third embodiment of the present invention. As is apparent from FIG. 11A, the recording head of this embodiment has the respective recording heads 1 and 4 corresponding to B ink and K ink arranged in the sub-scanning direction with an interval between their discharge port arrays corresponding to the amount of paper feeding.

More specifically, the recording condition in this embodiment is a recording density of 300 DPI, and in this case, the droplet volume in the same process as in the second embodiment as described above is determined as 113 pl. At this time, the plane density of mono-color ink becomes 15.8 nl/mm$^2$. This is, as shown in FIG. 5, the range where no blotting of image occurs even in the case of the non-coated paper, but because it is a value approximate to the critical value of blotting, blotting may also sometimes occur.

Therefore, by providing an interval corresponding to the paper feeding amount between the respective recording heads, ink absorption is accelerated by the time of one scanning and paper feeding. By doing so, ink blotting can be surely cancelled.

The constitution of this embodiment has recording heads each having 50 discharge ports, and recording of A4 size is performed at a head driving frequency of 4 kHz. In this case, scanning is performed for 72 times as shown in FIG. 11B.

In the embodiments as described above, ink is discharged by heat energy of electrothermal transducer, etc., but the discharge energy generation means is not limited thereto, as a matter of course.

As is apparent from the above description, the recording regions of each recording head in one scanning are divided.

By this, it becomes possible to perform recording corresponding to paper feeding and the respective recording regions per one scanning.

As the result, overlapping recording with time intervals can be done without lowering the recording speed as a whole, whereby not only image quality deterioration such as overlapping recording can be prevented, but also it has become possible to correspond to a diversity of recording media.

In the embodiments as described above, description has been made about the recording method and the recording device by utilizing the advantage of multi-head nozzle to the maximum by changing the arrangements of a plural number of recording heads. In the latter half of the following embodiments, other than the modification examples of the above embodiments, the device, the recording method which can obtain the effects of the present invention while using the ordinary arrangement of a plural number of recording heads are to be described. The following embodiments have the merit of accomplishing miniaturization of recording heads than the previous embodiments.

Figure 12:
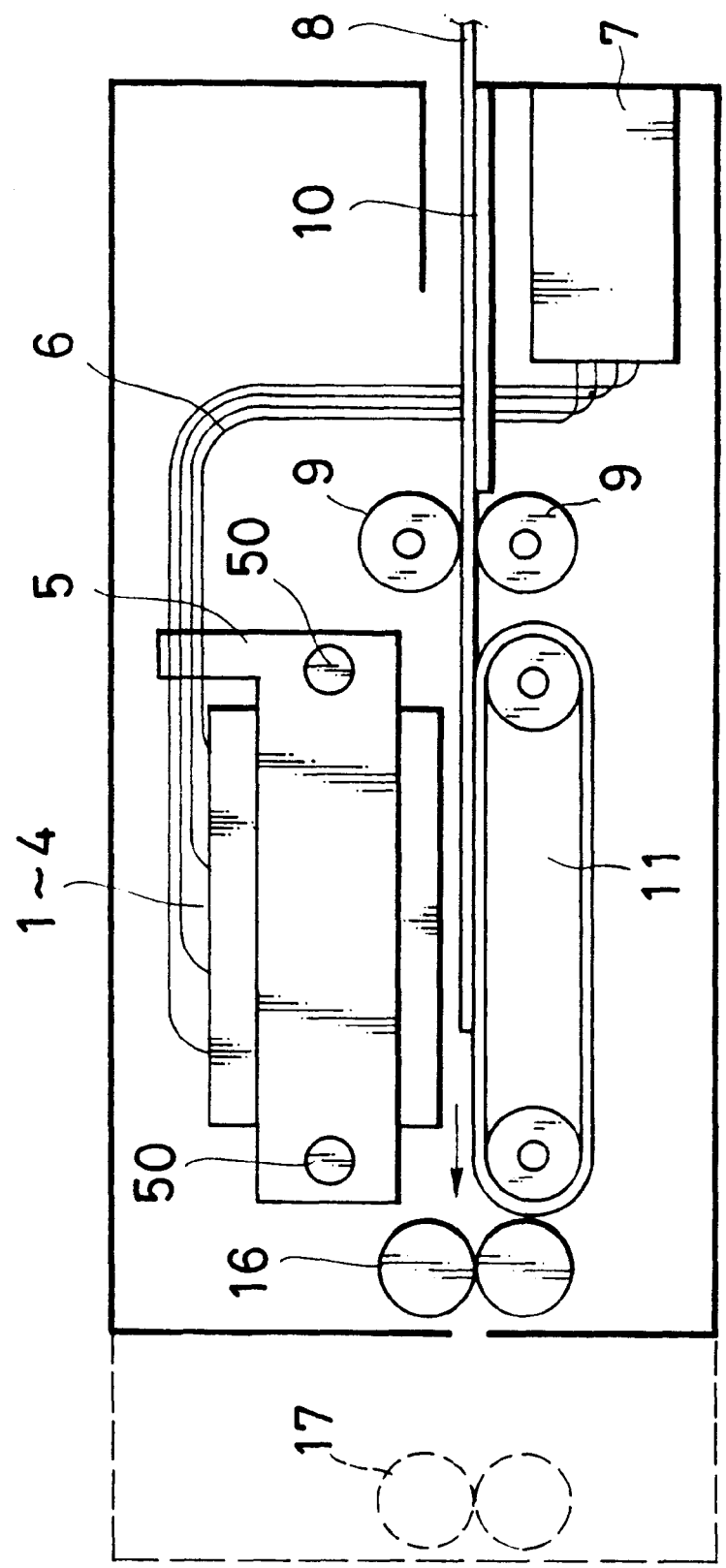
FIG. 12 is a side sectional view of the ink jet recording device according to the fourth embodiment of the present invention.

FIG. 12 is a side sectional view showing the principal part of the ink jet recording device according to the fourth embodiment of the present invention.

In FIG. 12, description of the same constitutions as in FIG. 1 is redundant and hence omitted here. In the following, only the characteristic constitutions are to be described.

FIG. 12 has recording heads 1 to 4 mounted on a carriage in parallel to the scanning direction as shown in FIG. 14. Also, to the recording heads 1 to 4 is connected the control portion shown in FIG. 13.

Figure 13:
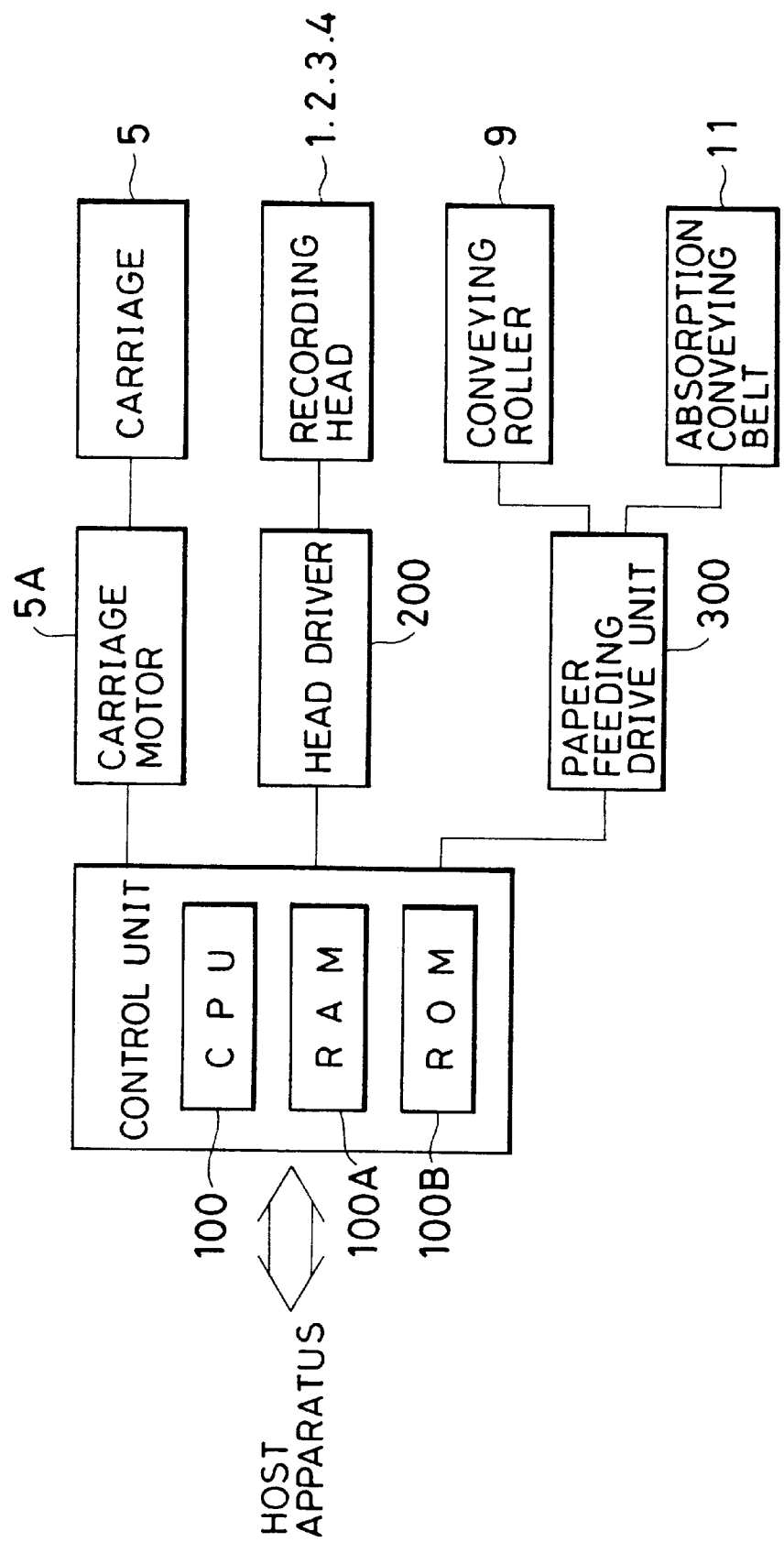
FIG. 13 is a block diagram showing the control constitution according to recording of the device shown in FIG. 12.

FIG. 13 is a block diagram showing the recording control in the ink jet recording device shown in FIG. 12. In the same FIG. 5A is the carriage motor for driving the carriage 5 through a carriage driving mechanism such as belt, pulley, etc., and 200 is the head driver for generating discharge signals for the respective discharge ports based on the recording data supplied from the control section. 300 is the paper feeding driving section for driving the conveying roller 9 and the belt 11, and the paper discharge roller pair 16.

The control section 7 shown in the Figure has CPU100 which practices processing according to control of the device while performing giving and receiving of the data between the host device or the respective sections of the recording device, RAM100A which becomes the work area in processing of CPU100, and ROM100B which memorizes the processing procedure such as recording actuation, etc. as shown in FIG. 14A and FIG. 14B.

FIGS. 14A and 14B are diagrams for illustration of the recording method in the embodiment shown in FIG. 12. In FIG. 14A, the recording heads 1 to 4 for discharging respectively the inks of the respective colors of R, G, B and K are supported and fixed on the carriage 5 so that the respective recording regions by scanning of the carriage 5 may become the same. In the same Figure, the discharge port arrays 12 to 15 cannot be seen as they are, but for convenience of description, they are shown as perspective from above.

The recording heads 1 to 4 perform recording on a recording medium by discharging ink through the discharge ports 12 to 15 corresponding to the recording signals inputted as synchronized with the movement of the carriage 5.

In this embodiment, printing is performed with the discharge port arrays 12 to 15 each divided into four recording regions. The four recording regions (1) (4) have the width of the width L of the discharge port array equally divided into 4, and constituted so that recording may be performed only with one head in each recording region. The recording region (1) performs recording with the use of the L/4 width on the paper feeding side of the head 4 of K ink, the recording region (2) with the head 3 of B ink, the recording region (3) with the head 2 of G ink, and the recording region (4) with the L/4 width on the paper discharge side of the head 1 of R ink. The recording medium 8 is recorded in the order of K, B, G, R while being conveyed for every scanning of the carriage 5 with the same width of the recording regions equally divided by the conveying roller pair 9 and the adsorption conveying belt 11. FIG. 14B shows only the recording signals corresponding to the recording regions as described above. Also, in the portions not corresponding to the recording regions of the respective heads, 0 is inputted as the non-recording signal.

Based on the above constitution, in the first scanning, recording is done corresponding to the recording signal K1 (signal corresponding to L/4 width) with the head 4 of K ink. Then, paper feeding of L/4 width is done, and the portion where recording of the signal K1 is done in the first scanning proceeds to the recording region (2) and is recorded overlappingly by the recording signal B1 (B component on the same line as K1) with the head 3 of B ink. At the same time, recording of the recording signal K2 (K component of the line subsequent to K1) is done with the head of the recording region (1). After the second scanning, the recording medium, after paper feeding of L/4 width, transfers to the third scanning. In the third scanning, recording of K3, B2, G1 is practiced in the respective recording regions similarly. Further, in the fourth scanning, recording of K4, B3, G2, R2 is practiced, and on the first line of the recording medium is formed a color image according to the recording signals of K1, B1, G1, R1. Thus, by carriage scanning (color recording in response to recording signals) and paper feeding of L/4, color images are successively formed.

In this embodiment, since the recording region is divided into 4, scanning corresponding to 3 times becomes necessary as superfluous scanning as compared with the prior art. After completion of all scanning, the recording medium 8 is discharged out of the machine by the paper discharge roller pair 16. The function of the paper discharge roller 16 is stabilization (aiding of adsorption conveying belt, protection of unnecessary force applied from outside of the machine) of the recording medium at the recording section and discharging of the terminal end.

Now, as shown in FIG. 4, FIG. 5, depending on the recording medium, the amount of ink absorbes differs greatly. Accordingly, it is preferable to change the amount of ink discharge according to the recording medium. This has not been done at all in the prior art. In the present invention, from this experiment, the ratio of divided use of the recording heads is determined so that the ink amount which can be recorded within a short time may become 20 nl/mm$^2$ or less in the non-coated paper and 25 nl/mm$^2$ or less in the coated paper.

To describe again, the absorption of ink onto paper, as shown in FIG. 6A may be considered to be effected in the order of contact, collision, dot formation, permeation, drying. As shown in FIG. 4, in the case of the non-coated paper, in a time of 0.2 S or shorter, no ink of 11 to 12 nl/mm$^2$ or more can be absorbed and therefore, ink is discharged in an amount smaller than this range. Accordingly, in the present invention, such problem can be prevented that the ink will be overflowed and, as shown in FIG. 6B, the overflowed ink is attracted to the adjacent ink which has reached previously onto the paper, whereby blotting occurs at the boundary portion.

In short, in the present embodiment, since head scanning is performed successively with the recording regions for the respective heads being adequately separated depending on the recording medium in one scanning, blotting at the boundary portion as shown in FIGS. 7A and 7B can be reduced to great extent.

For verifying the effect of this embodiment, the recording test was performed under the conditions shown below and consequently good recorded images little blotting at the boundary portion could be obtained. In contrast, when recording was performed simultaneously with the arrangement of heads being constituted so that the respective head recording regions were overlapped with each other as in the ink jet recording device in the prior art, images which were entirely practically useless were obtained.

To describe in detail, this embodiment can perform recording of 7 colors by use of 4 colors of R, G, B, K, and recording was performed on a recording medium of A4 size at a recording density of 360 DPI and a driving frequency of 5.4 kHz. For this recording medium, a two-fold paper on which the diameter of the ink droplet emitted is expanded to 2-fold is used.

In this case, because the recording density is 360 DPI, the picture element size becomes 70.56 $\mu$m square, and the dot diameter embedding the picture element as a whole becomes 100 $\mu$m. Accordingly, the droplet diameter emitted onto the 2-fold paper becomes 50 $\mu$m, namely its volume becomes 65.5 pl.

When recording is performed under such conditions, the plane density of mono-color (one discharge) becomes 13.2 nl/mm$^2$, and the plane density of two colors (two discharges) becomes 26.3 nl/mm$^2$, and when two colors are overlapped or adjoined at the same time as shown in FIG. 5, the image becomes bad.

Figures 15A, 15B:
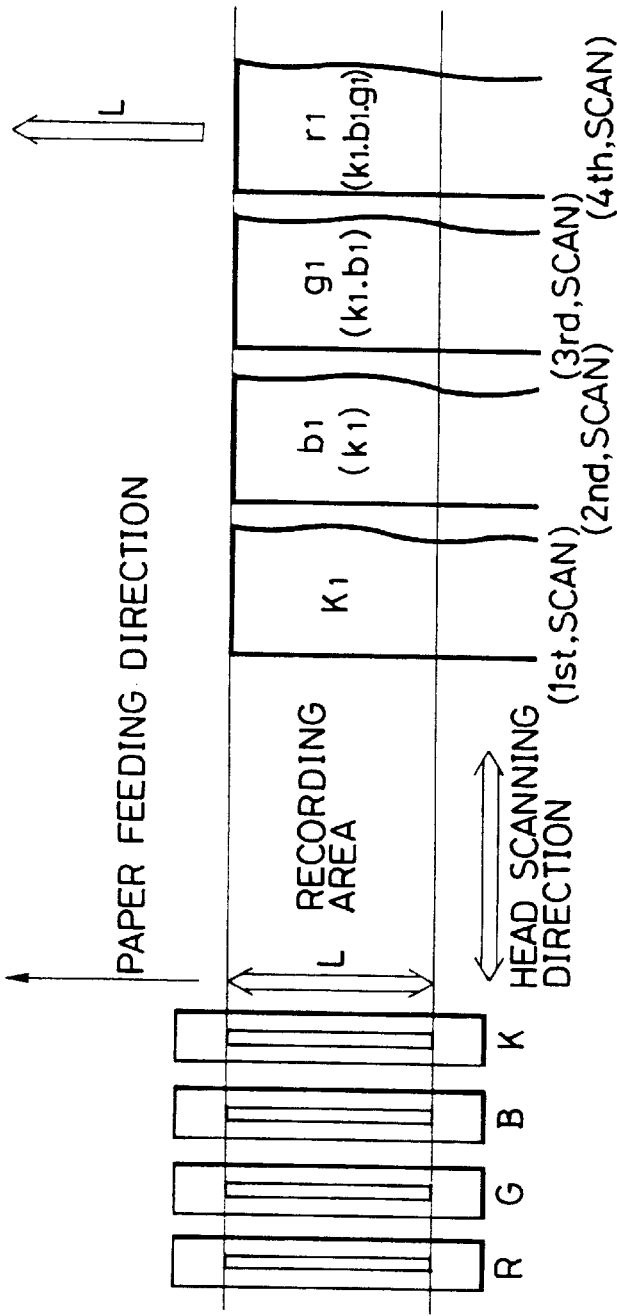
FIG. 15A and FIG. 15B are conceptional views showing the recording mode of the prior art, which is applicable to the seventh embodiment of the present invention.

Also, as in the constitution of the prior art shown in FIGS. 15A and 15B, when recording is performed without dividing the recording region so that paper feeding may be performed per every carriage scanning for 4 times, because the recording medium 8 contacts the paper discharge roller pair 16 immediately after ink emission of the fourth color, image disturbance will occur by the contact onto the paper discharge roller. For this reason, as shown by the broken line in FIG. 12, it becomes necessary to constitute the paper discharge roller pair with the width L of the discharge port array or longer apart from the recording section, whereby the device becomes enlarged and also the aiding effect for the conveying belt 11 (stabilization of the recording medium) is also lowered to make it necessary to expand the opposed distance between the head and the recording medium, resulting in deterioration of the shooting precision of ink.

In contrast, since this embodiment is a constitution such that the recording medium reaches the paper discharge roller after scanning for 3 times on completion of all recording of the first portion, the image fixing is stabilized during this period and no image disturbance will occur.

Also, for example, in the case of recording only of K ink, recording may be performed in the whole head region, and paper feeding may be done with L width, whereby the recording speed can be made greater in the case of mono-color recording.

In the case when the recording medium is a transparent film formed of PET or PET coated with an water absorptive material, the present embodiment is also effective.

Also, the present embodiment is effective for obtaining recording of higher image quality even in the case of a recording medium having ink absorptivity such as the coated paper.

Further, even in the case of performing mono-color recording with one multi-nozzle head, there is the effect in making the image quality higher similarly as in the present embodiment. That is, by use of a head with discharge amount set small so that the same picture element may be formed with two ink droplets, by recording ink of the same color with divided nozzles, the image deterioration by connection of the ink in the nozzle array direction can be reduced. Thus, the emission of ink of the same color divided each into 6.6 nl/mm$^2$, with the droplet volume being made about half under the same conditions as in the present embodiment, further higher image quality can be accomplished. Also, with the discharge amount being made the same as in the present embodiment, by emission of ink of the same color in double amount without blotting, high density recording becomes possible.

Figure 16:
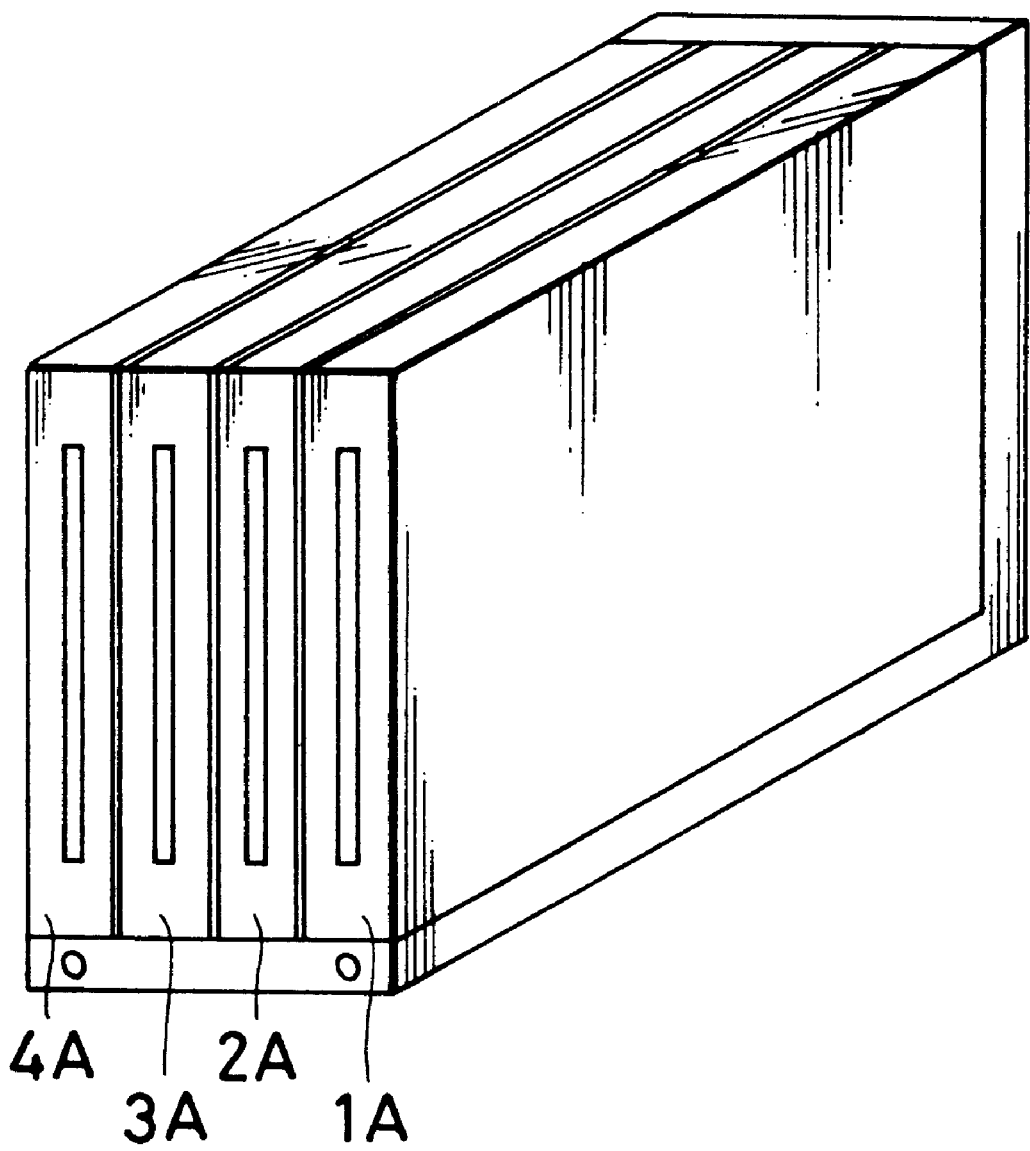
FIG. 16 is a perspective view showing the ink jet cartridge of 4 heads integrated in the fifth embodiment.

FIG. 16 is a perspective view showing the fifth embodiment of the present invention, and this embodiment has a constitution of recording heads corresponding to recording of full color. That is, it has recording heads 1A, 2A, 3A and 4A corresponding to the respective colors or yellow (Y), magenta (M), black (K) and cyan (C).

Each of these recording heads has 128 discharge ports arrayed in the sub-scanning direction. Also, it is a recording head of the cartridge type which constitutes integrally the ink tanks of the respective colors, and therefore when there is no more ink, the whole recording head is exchanged with another cartridge.

When high resolution recording is performed as in this embodiment, the positional precision between the heads is required to be higher, and by exchange of the head with 4 colors integrated as in the head of this embodiment, it becomes possible to effect strict registration during shipment, and even in a device of the head exchange system, high image quality recording extracting fully the performance of the head is rendered possible.

FIGS. 17A and 17B are conceptional views showing the recording method by the recording head shown in FIG. 16 which are similar to FIGS. 14A and 14B, respectively.

This embodiment shows the constitution in which recording at a recording density of 600 DPI is performed on a 2-fold paper. Thus, since the recording density if 600 DPI, the picture element size 42.33 $\mu$m is determined, and similarly as described above, the droplet diameter become 30 $\mu$m and its volume 14.2 pl.

As the result, the plane density when mono-color, 2 colors, 3 colors and 4 colors are emitted overlappingly or adjoiningly become respectively 7.9 nl/mm$^2$, 15.8 nl/mm$^2$ 23.7 nl/mm$^2$ and 31.6 nl/mm$^2$. Again, as is apparent from FIG. 5, the permissible range where no blotting or ink occurs in this embodiment is up to 2 colors.

Accordingly, as shown in FIG. 17A, it becomes possible that the recording heads corresponding to 2 colors make the recording regions the same. That is, the recording heads 2A and 4A of M ink and C ink have the same recording regions as the recording heads 1A and 3A of Y ink and K ink, respectively, and recording of A3 size is performed by scanning for 153 times in the data mode as shown in FIG. 17B.

Figure 17:
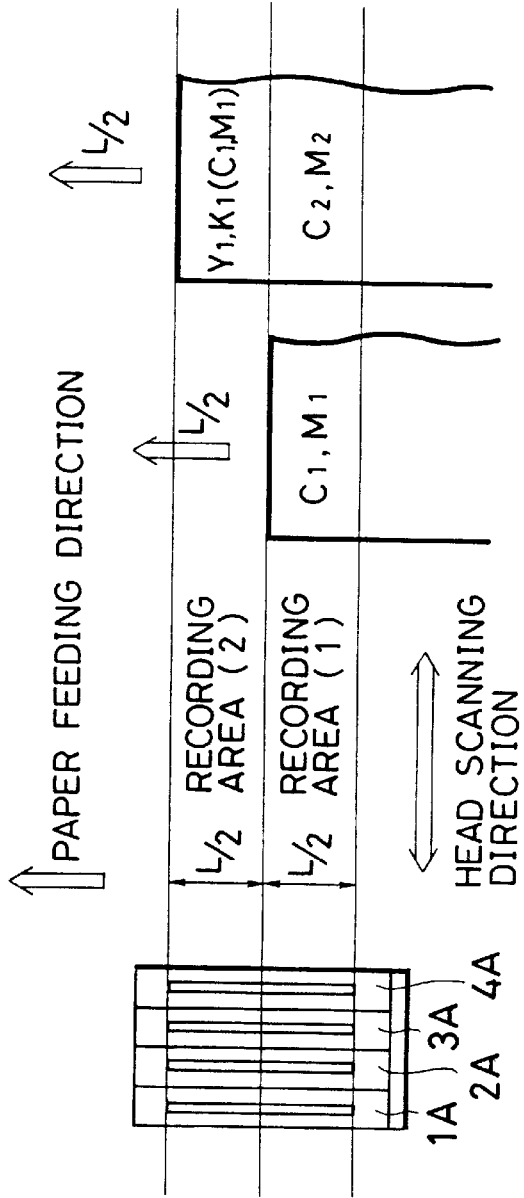
FIG. 17A and FIG. 17B are conceptional views of the recording method in the fifth embodiment.
Figure 18:
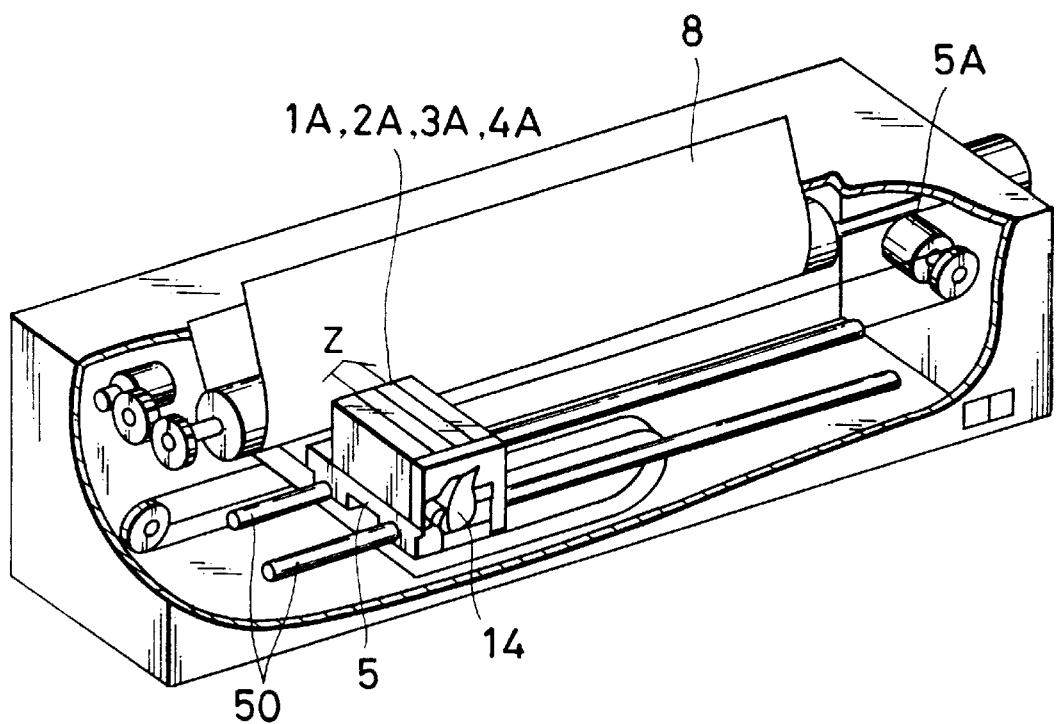
FIG. 18 is a perspective view of the ink jet recording device according to the fifth embodiment of the present invention.

FIG. 18 is a perspective view of an ink jet recording device which can mount the recording heads shown in FIG. 16 and FIG. 17, and the carriage 5 is engaged slidably with a pair of guide shafts, and makes scanning of the recording regions with the recording heads 1A, 2A, 3A, 4A possible by driving of the carriage motor 5A.

Thus, the number of the recording regions divided can be set as desired, and this setting is done by varying the paper feeding amount and the recording signal supplied to the recording heads in the control constitution shown in FIG. 13. By doing so, the method can correspond to recording media inferior in ink absorption characteristic, such as plain paper or transparent paper for OHP, whereby recording media can be diversified.

Among plain papers, some are also poor in color formability of ink, and it may be sometimes necessary to increase the density, particularly in the case of recording with a mono-color ink. In this case, for example, the discharge ports of the recording head of K ink are divided into two, and the same recording as in the constitution shown in FIG. 17A is practices. The recording signals at this time are shown below.

Head scanning 1 2 3 . . . 150 151 152 153
K(2) region 0 $K_1$ $K_2$ . . . $K_{149}$ $K_{150}$ $K_{151}$ $K_{152}$
K(1) region $K_1$ $_{K2}$ $K_3$ . . . $K_{150}$ $K_{151}$ $K_{152}$ 0

According to this embodiment, it becomes possible to diversify the recording media by diversifying of the recording mode. Also, although image deterioration through the difference in shooting precision, discharged amount, etc. existing between the discharge ports is intensified by overlapping recording with the same ports, it will not be intensified in overlapping recording by use of divided discharge ports, but alleviated in most cases.

Figure 19:
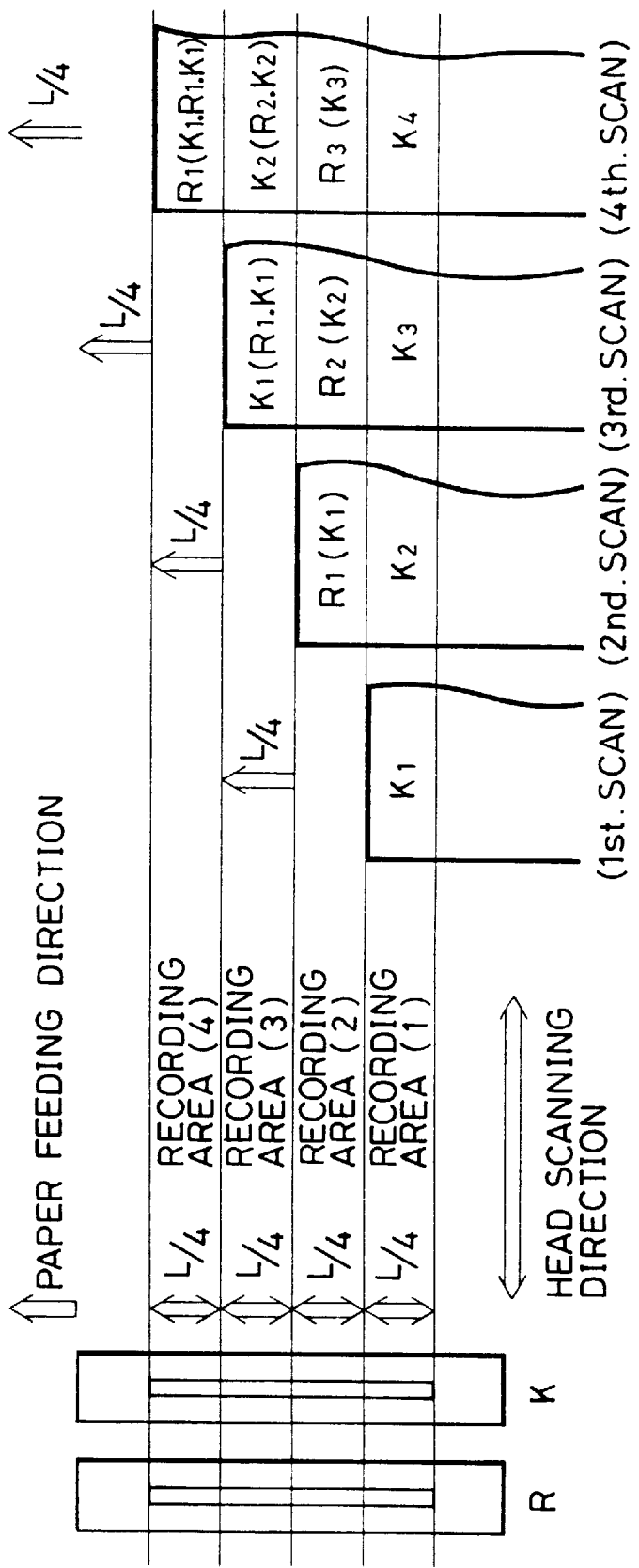
FIG. 19 is a conceptional view of the recording method in the sixth embodiment of the present invention.

FIG. 19 is a conceptional view of the recording method according to the seventh embodiment of the present invention.

This embodiment has a constitution tekan in the case of low recording density, and in this case, because the ink density of mono-color becomes higher, the possibility of blotting between the scanning lines becomes higher.

The recording medium to be used in this embodiment is a film for transmission type OHP, and in this case, since the projected light transmits the transparent film only once, and therefore absorption with the dye becomes smaller, whereby contrast of the projected image can be obtained with difficulty. For this reason, a thick ink receptive layer (opaque) is provided on a film such as PET, etc., whereby ink absorptivity can be improved, and therefore by performing recording with 4 divided recording regions, recording of high density without blotting becomes possible.

For recording in this embodiment, inks of two colors of R and K were employed, and two heads having 50 discharge ports were arrayed in the scanning direction. Recording of A4 size was performed at a recording density 300 DPI and a driving frequency of 4 kHz.

As the result, the picture element size became 84.67 $\mu$m square, the picture element dot diameter 120 nm, the droplet diameter 60 nm, the droplet volume 113 pl, the mono-color ink plane density 15.8 nl/mm$^2$, and two-color ink plane density 31.6 nl/mm$^2$.

The recording signals in the recording method shown in FIG. 19 are shown in the following Table.

| Head scanning | 1 | 2 | 3 | 4 | 5 | 6 | 7 | 8 | 9 ... |
|---|---|---|---|---|---|---|---|---|---|
| K(4) region | 0 | 0 | 0 | 0 | 0 | 0 | 0 | 0 | 0 ... |
| K(3) region | 0 | 0 | K1 | K2 | K3 | K4 | K5 | K6 | K7 ... |
| K(2) region | 0 | 0 | 0 | 0 | 0 | 0 | 0 | 0 | 0 ... |
| K(1) region | K1 | K2 | K3 | K4 | K5 | K6 | K7 | K8 | K9 ... |
| K(4) region | 0 | 0 | 0 | R1 | R2 | R3 | R4 | R5 | R6 ... |
| K(3) region | 0 | 0 | 0 | 0 | 0 | 0 | 0 | 0 | 0 ... |
| K(2) region | 0 | R1 | R2 | R3 | R4 | R5 | R6 | R7 | R8 ... |
| K(1) region | 0 | 0 | 0 | 0 | 0 | 0 | 0 | 0 | 0 ... |

As described above, when overlapping recording is performed with inks of plural colors, the emission amount of inks will become very high in density, and therefore in the system as in the prior art wherein recording of the next line is commenced with paper feeding per every completion of scanning for plural times, the difference in ink receptive amount between the lines becomes greater. As the result, image deterioration (density nonuniformity) of the joint which may be considered to be caused to the change in absorption phenomenon of ink of the next line is liable to be generated at the boundary portion between scanning lines, whereby blotting of the previous line toward the paper feeding direction is great.

In contrasts, in the seventh embodiment as described above, since the ink receptive amount changes gradually per every line, such trouble becomes little.

Also, as the problem caused by increase of ink amount, there may sometimes occur waving phenomenon of paper due to swelling, stretching and shrinkage by ink reception of the paper, but in the present embodiment, since the region which has become to have the maximum ink density within the same time has become smaller as compared with the prior art example as described above, there is also the effect that waving is suppressed. Accordingly, it is not necessary to expand specially the interval between the head and the recording medium, whereby shooting precision is more excellent than the prior art example to improve image quality.

As is apparent from the above description, according to the plural number of recording heads, recording medium is conveyed with only the width of the recording divided in every one scanning, and recording is performed only with the predetermined discharge ports corresponding to the recording regions in response to such conveyance.

As the result, as compared with separate recording for the respective colors with the whole head width without division of the recording region, the ink emission region or one scanning can be made narrower substantially without increasing the scanning times, and therefore cockling which is the waving phenomenon of recording medium can be made little. Also, since the paper discharge portion can be made shorter, miniaturization of the main body has been rendered possible.

Further, as compared with overlapping recording of the recording region over the whole head width, the width of the region reaching the maximum density at the same time can be made narrower substantially without increasing the scanning times, and therefore cockling can be made little, and also the difference in ink receiving ability during emission between the scanning lines can be made little, whereby the density uniformity at the line boundary portion has become better. Also, since overlapping emissions are done through separate discharge ports, the density irregularity due to the difference in discharge port precision is alleviated. Also, in performing overlapping recording, the recording time can be reduced, and otherwise the joint between the images can be made better.

Further, in addition, a desirable diversity of recording can be provided to users, whereby it has become possible to perform good recording on a diversity of recording media.

Figures 20, 21:
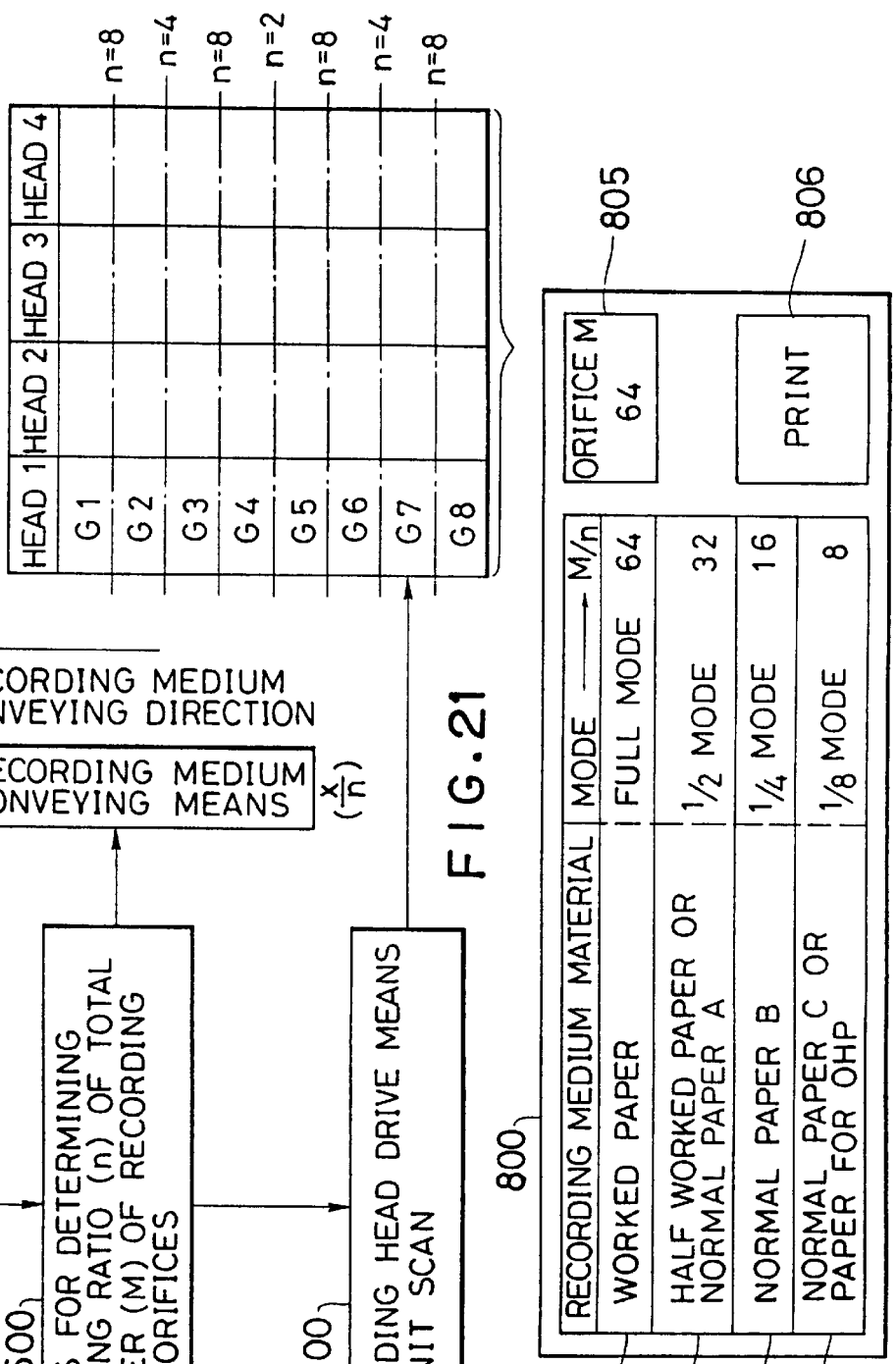
FIG. 20 is a schematic illustration of the pertinent portion of the seventh embodiment of the present invention.
FIG. 21 is a schematic illustration of the pertinent portion of the operation panel to be used in the seventh embodiment.

FIG. 20 shows the basic schematic view of the device for obtaining the optimum recording speed improvement ratio after having obtained higher density or higher image quality by partial use of the respective heads of the present invention.

400 is a means for detecting automatically or manually the material of the recording medium (difference in materials, including paper or resin sheet or converted paper, semiconverted paper, those with great ink absorption amount, plain paper A, B, C: see FIG. 21), and as the automatic discrimination, various known discrimination methods such as light transmission, attachment of different marks according to the respective materials and discrimination thereof, etc. can be utilized. 500 is a means for determining the number for the total number M of the discharge ports of each recording head, and in this embodiment, the divided ratio n of the total number M is determined in the present embodiment. Specifically, the means 500 has determined which one of the groups G1 to G8 (G1 to G8 are groups each having 8 discharge ports) suited for recording of the recording heads 1, 2, 3, 4 suitable for the material of the recording material should be used. According to the specific example of the present embodiment, also by referring to FIG. 21, the ink absorption amount is large to the extent which requires no divided uses for converted paper with large ink absorption amount, and therefore no divided driving may be practiced, but recording speed will be thereby lowered. For this reason, for utilizing the effect of the present invention, n may be preferably 2 or more. For the ratio n, with the discrimination result of semi-converted paper, plain paper A, n=2 is employed, and recording of the embodiment shown in FIGS. 17A, 17B as described above is practiced. On the other hand, with the discrimination result of plain paper B, n=4 is employed, and recording of the embodiment shown in FIG. 19 is practiced. Further, for plain paper C or OHP sheet, n=8 is employed, and group G1 units with one scanning width of discharge ports 8 are practiced as in the above-mentioned embodiment.

600 is a recording head driving means, and the recording signal imparting regions which are the discharge ports to be used for the recording heads 1, 2, 3, 4 are determined and driven on the basis of the ratio n determined by the above-mentioned determining means 500. 700 is a recording medium conveying means, and for the printable regions x at all the discharge ports of the recording head, the conveying amount x/n of one scanning unit is determined on the basic of the ratio n determined by the determining means 500, and the pitch with respect to the recording medium conveying direction which is the sub-scanning in the recording mode determined is continued to be delivered each by x/n.

With the constitution shown in FIG. 20, regardless of the kind of the recording medium, ink jet recording of good quality and high speed can be surely performed.

FIG. 21 shows the display panel 800 by which the operator determines the division ratio n for conveying the abovementioned recording heads corresponding to the recording medium to be employed. 801 is the key for converted paper, and by turning on the key, the recording mode described in FIG. 21 is set. Similarly, 802 is the key for semi-converted paper, plain paper A, 803 the key for plain paper B, and 804 the key for plain paper C or sheet for OHP. 805 displays the total discharge port number M of the recording head, and in this embodiment represents 64. 806 displays during print or the print switch of operation.

Even if the constitution may be made as shown in the operational panel of FIG. 21 in which the operator can simply determine and employ the recording mode of the present invention, the effects of the present invention can be fully obtained. The all discharge port utilization mode of the key 801 is not required in practice as a matter of course, but may be also provided for practicing various kinds of recording systems.

The numerical values in the foregoing embodiments are not of course limiting conditions for the present invention, and the precision of the present invention is enough even if the number of discharge ports to be used may be determined without determination of the ratio of the total number of discharge ports.

The present invention brings about excellent effects particularly in recording heads, recording devices of the bubble jet system among the ink jet recording systems.

Its representative constitutions and principles should be preferably those by use of the basic principle disclosed in U.S. Pat. Nos. 4,723,129 and 4,740,796. This system is applicable to either of the so called on-demand type and continuous type, but particularly in the case of the on-demand type, it is effective, because by applying at least one driving signal which gives abrupt temperature elevation exceeding nuclear boiling to the electrothermal transducers arranged corresponding to the sheets or liquid passages on which liquid (ink) is held, heat energy can be generated in the electrothermal transducers to effect film boiling on the heat-acting surface of the recording head, and consequently form bubbles within the liquid (ink) corresponding one by one to the driving signal. Even if the liquid (ink) may be discharged through opening for discharge by growth, shrinkage of the bubbles, at least one droplet will be formed. By making the driving signal shaped in pulse, instantly growth and shrinkage of the bubble are effected adequately, whereby discharge of liquid (ink) particularly excellent in response characteristic can be more preferably accomplished. As the pulse-shaped driving signal, those as described in U.S. Pat. Nos. 4,463,359 and 4,345,262 are suitable. Further recording can be performed by employment of the conditions disclosed in U.S. Pat. No. 4,313,124 concerning the temperature elevation ratio of the above-mentioned heat-acting surface.

As the constitution of the recording head, in addition to the combined constitution of discharge port, liquid passage, electrothermal transducer as disclosed in the respective specifications as mentioned above (linear liquid passage or right angle liquid passage), the constitutions by use of U.S. Pat. Nos. 4,558,333 and 4,459,600 disclosing the constitution in which the heat-acting portion is arranged in a flexed region are also included within the present invention. In addition, the present invention is also effective even if the constitution may be made one based on the constitution disclosed in Japanese Laid-Open Patent Application No. 59-123670 which discloses the constitution comprising a slit common to a plural number of electrothermal transducers as the discharge portion of the electrothermal transducers or the constitution Japanese Laid-Open Patent Application No. 59-138461 which discloses the constitution comprising opening for absorbing the pressure wave of heat energy corresponding to the discharge portion.

In addition, the present invention is also effective for the case of using a recording head of the freely exchangeable chip type which enables electrical connection to the main device or feeding of ink from the main device by mounting onto the main device, or a recording head of the cartridge type integrally provided on the recording head itself.

Also, addition of restoration means, preliminary aiding means, etc. to the recording head is provided as the constitution of the recording device of the present invention is preferable, because the effects of the present invention can be further stabilized. Specific examples of such means may include, for recording heads, capping means, cleaning means, pressurization or suction means, preliminary heating means such as electrothermal transducer or heating element separate from this or combination of these, and it is also effective for performing stable recording to practice a preliminary discharge mode which performs discharging separately from recording.

Further, as the recording mode of the recording device, not only the recording mode only of the main color such as black, etc., but also the recording head can be constituted integrally or according to a combination of plural number, and the present invention is extremely effective also for a device equipped with at least one of complex colors with different colors or full colors by color mixing.

The present invention can solve adequately the various problems found by the present inventors according to the constitution, driving not found in the prior art, and is an industrially effective invention.

What is claimed is:

1. An ink jet recording device for recording onto plural types of recording medium comprising:
    at least one ink jet recording head;
    scanning means for scanning said at least one ink jet recording head in a scanning direction, wherein said at least one ink jet recording head has a plurality of ink discharge energy generating elements and a plurality of discharge ports associated therewith, and wherein said discharge ports are adapted to perform a recording operation within a recording area which is a total area covered by said discharge ports during one scanning operation;

supplying means for supplying recording signals corresponding to the recording area to a group of the ink discharge energy generating elements;

conveying means for conveying one of said plural types of recording medium relative to said at least one ink jet recording head;

detecting means for detecting a type of recording medium being conveyed by the conveying means; and control means for controlling said at least one ink jet recording head, said supplying means and said conveying means, said control means operating in a first recording mode and a second recording mode, wherein when said control means operates in the first recording mode, a recording operation within said recording area is completed in a single scanning operation, wherein when said control means operates in the second recording mode, said at least one ink jet recording head is divided into plural recording regions, each recording region including plural discharge ports of the ink let recording head, and the recording operation within said recording area is completed by plural scanning operations such that the recording area is subjected to overlapped recordings by plural discharge ports of different plural recording regions based on identical recording signals supplied by said supplying means, and wherein the control means selects the first recording mode or the second recording mode based on a result of detection of the detecting means.

2. An ink jet recording device according to claim 1, wherein said ink discharge energy generating element comprise electrothermal transducers of thermal energy generating elements which cause film boiling to occur in the ink.

3. An ink jet recording device according to claim 1 or claim 2, wherein said recording heads are arranged in the scanning direction.

4. An ink jet recording device according to claim 1 or claim 2, wherein a part of the recording area recorded during the second recording mode is 1/n of the recording area, wherein n is an integer which can be varied.

5. An ink jet recording device according to claim 1 or claim 2, wherein said portion of the recording area recorded in the second recording mode is a half of the recording area.

6. An ink jet recording device according to claim 1 or claim 2, wherein the portion of the recording area recorded in the second recording mode is a quarter of the recording area.

7. An ink jet recording device according to claim 1 or claim 2, wherein the portion of the recording area recorded in the second recording mode is an eighth part of the recording area.

8. An ink jet recording device according to claim 1 or claim 2, wherein said plurality of recording heads is four.

9. An ink jet recording device according to claim 8, wherein said four recording heads emit Y, M, C and K inks respectively.

10. An ink jet recording device according to claim 8, wherein said four recording heads emit, R, G, B and K inks respectively.

11. An ink jet recording device according to claim 1 or claim 2, wherein said recording heads are integrally formed.

12. An ink jet recording device according to claim 1 or claim 2, wherein said recording heads are exchangeable.

13. An ink jet recording device according to claim 1 or claim 2, wherein said control means increases the portion covered per scanning operation by increasing the number of said recording heads used for recording and reduces the portion covered per scanning operation by reducing the number of said recording heads used for recording.

14. An ink jet recording device according to claim 1 or claim 2, wherein said control means increases the portion covered per scanning operation by increasing the recording area of at least one of said recording heads, and decreases the portion covered per scanning operation by decreasing the recording area of at least one of said recording heads.

15. An ink jet recording device according to claim 1, wherein said recording area recorded in the second recording mode is defined by the number of discharge ports.

16. An ink jet recording device according to claim 1, wherein said portion of the recording area recorded in the second recording mode is defined by a number of the discharge ports.

17. An ink jet recording device according to claim 1, wherein said control means selects the second recording mode when the recording medium has a poor ink coloring property.

18. An ink jet recording device according to claim 1, wherein said control means selects the second recording mode when the recording medium is a film for OHP.

19. An ink jet recording method for recording onto plural types of recording medium using at least one ink jet recording head, the method comprising the steps of:

scanning said at least one ink jet recording head in a scanning direction, wherein said at least one ink jet recording head has a plurality of ink discharge energy generating elements and a plurality of discharge ports associated therewith, and wherein said discharge ports are adapted to perform a recording operation within a recording area which is a total area covered by said discharge ports during one scanning operation;

supplying recording signals corresponding to the recording area to a group of the ink discharge energy generating elements;

conveying one of said plural types of recording medium relative to said at least one ink jet recording head;

detecting a type of recording medium being conveyed by the conveying step; and controlling said at least one ink jet recording head, said supplying step and said conveying step, said control step operating in a first recording mode and a second recording mode, wherein when said control step operates in the first recording mode, a recording operation within said recording area is completed in a single scanning operation, wherein when said control step operates in the second recording mode, said at least one ink jet recording head is divided into plural recording regions, each recording region including plural discharge ports of the ink jet recording head, and the recording operation within said recording area is completed by plural scanning operations such that the recording area is subjected to overlapped recordings by plural discharge ports of different plural recording regions based on identical recording signals supplied by said supplying step, and wherein the control step selects the first recording mode or the second recording mode based on a result of detection of the detecting step.

* * * * *

UNITED STATES PATENT AND TRADEMARK OFFICE
CERTIFICATE OF CORRECTION

PATENT NO. : 6,227,649 B1
DATED : May 8, 2001
INVENTOR(S) : Hiromitsu Hirabayashi et al.

It is certified that error appears in the above-identified patent and that said Letters Patent is hereby corrected as shown below:

Column 3,
Line 60, "medium,. and" should read -- medium, and --.

Column 4,
Line 58, "means," should read -- means. --.

Column 6,
Line 59, "pooley," should read -- pulley, --.

Column 11,
Line 19, "FIG." should read -- Figure, --; and
Line 52, "(1)(4)" should read -- (1)-(4) --.

Column 12,
Line 34, "absorbes" should read -- absorbed --.

Column 13,
Line 59, "similarly as in" should read -- similar to --.

Column 14,
Line 32, "if" should read -- is --.

Column 15,
Line 4, "practices." should read -- practiced. --;
Line 8, "$K_1\ _{K2}\ K_3$" should read -- $K_1\ K_2\ K_3$ --; and Column 16,
Line 1, "contrasts," should read -- contrast, --.

UNITED STATES PATENT AND TRADEMARK OFFICE
CERTIFICATE OF CORRECTION

PATENT NO. : 6,227,649 B1
DATED : May 8, 2001
INVENTOR(S) : Hiromitsu Hirabayashi et al.

It is certified that error appears in the above-identified patent and that said Letters Patent is hereby corrected as shown below:

<u>Column 19,</u>
Line 21, "let" should read -- jet --; and
Line 33, "element" should read -- elements --.

Signed and Sealed this

Twenty-sixth Day of March, 2002

Attest:

JAMES E. ROGAN
Attesting Officer    Director of the United States Patent and Trademark Office